(12) United States Patent
Hayashi et al.

(10) Patent No.: US 7,623,203 B2
(45) Date of Patent: Nov. 24, 2009

(54) LIGHT MODULATING MATERIAL

(75) Inventors: Naoyuki Hayashi, Kanagawa (JP); Koji Takaku, Kanagawa (JP); Takashi Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 11/907,932

(22) Filed: Oct. 18, 2007

(65) Prior Publication Data
US 2008/0094551 A1    Apr. 24, 2008

(30) Foreign Application Priority Data
Oct. 19, 2006    (JP)    ............... 2006-285186

(51) Int. Cl.
*G02F 1/1335* (2006.01)
*G02F 1/1337* (2006.01)

(52) U.S. Cl. .................. 349/106; 349/112; 349/130

(58) Field of Classification Search .......... 349/106, 349/112, 130
See application file for complete search history.

(56) References Cited

U.S. PATENT DOCUMENTS 5,342,545 A * 8/1994 Yamada et al. ......... 252/299.01
2004/0100598 A1 * 5/2004 Adachi et al. ............... 349/113
2007/0268427 A1 * 11/2007 Uehara ........................ 349/62

FOREIGN PATENT DOCUMENTS

WO    WO-02/093241 A1    11/2002
WO    WO-2004/005246 A2    1/2004

OTHER PUBLICATIONS

Kentaro Ichimura, Development of Chromic Material, CMC Publishing, pp. 226-236, 2000.
De Filpo et al., Liquid Crystals, vol. 29, No. 2, pp. 295-300, 2002.
Suzuki et al., Journal of Mater. Chem, vol. 13, pp. 2870-2874, 2003.
Liquid Crystal Handbook edited by the liquid crystal handbook editorial committee, Maruzen p. 498, 2000.

* cited by examiner

*Primary Examiner*—Mike Qi
(74) *Attorney, Agent, or Firm*—Birch, Stewart, Kolasch & Birch, LLP

(57) ABSTRACT

The invention provides a light modulating material capable of supplying a predetermined light modulating property over a long period of time regardless of an incident light condition. The light modulating material includes at least: a first liquid crystal layer which has at least a dichroic dye and changes from a colorless transparency state to a colored transparency state when voltage is applied thereto; and a second liquid crystal layer which changes from a colorless transparency state to a white light-scattering state when voltage is applied thereto. The second liquid crystal layer is provided closer to a surface of the light modulating material on which light is incident compared to the first liquid crystal layer.

24 Claims, 2 Drawing Sheets

LIGHT MODULATING MATERIAL

CROSS-REFERENCE TO RELATED APPLICATION

This application claims priority under 35 USC 119 from Japanese Patent Application No. 2006-285186, the disclosure of which is incorporated by reference herein.

BACKGROUND OF THE INVENTION

1. Field of the Invention

The present invention relates to a light modulating material.

2. Description of the Related Art

In light modulating materials using liquid crystal, switching between a scattered (light-shading) state and a transparent state is performed by the following methods.

For example, a method in which microcapsules containing liquid crystal are dispersed in a polymer has been suggested (see e.g. "Development of Chromic materials", edited by Kunihiro Ichimura, CMC Publishing, pp. 226-236, 2000). According to this method, when voltage is not applied, liquid crystal molecules align randomly and light scatters due to diffused reflection resulting from a difference in the refractive indices of the liquid crystal molecules and the polymer. When voltage is applied, the light modulating material becomes transparent because the liquid crystal molecules align in the same direction and the refractive indices of the liquid crystal molecules in a major axis direction and the polymer become substantially the same.

In the above method, it is necessary to dissolve dichroic dyes in the liquid crystal in order to color a liquid crystal device. However, this method is problematic in that the walls of the capsules may be stained with the dichroic dyes, or the voltage response may become nonexistent because the dichroic dyes have aligned along the polymer film too easily, resulting in a reduction of light transmittance of the light modulating material when in a transparent state.

Another method using a mixture of an uncured UV-curable resin, a polymerization initiator, liquid crystal, and a dichroic dye has also been suggested. In this method, the resin is cured by irradiation with UV light, and the polymer and the liquid crystal are phase-separated from each other such that an interface is formed between the polymer and liquid crystal. Accordingly, this method functions according to the same principle as the above-mentioned liquid crystal light modulating device (see, for example, WO 2002/093241 and WO 2004/005246).

However, this method is problematic in that the dye decomposes due to irradiation with UV light, or due to the presence of the polymerization initiator, resulting in deterioration in coloring properties.

In addition, in the above method, the light modulating material is in a colorless scattered state or a colored scattered state when voltage is not applied thereto. Therefore, it is impossible for the light modulating material to be in a transparent state when voltage cannot be applied thereto due to wiring problems, a discharged battery, or the like.

Contrastingly, a polymer dispersed liquid crystal (PDLC) is known in which liquid crystal and a polymer are phase-separated due to crosslinking of the polymer which resides between transparent electrodes, and a liquid crystal mixture into which a gelation agent is injected is also known. It is known that the polymer dispersed liquid crystal and the liquid crystal mixture are transparent when voltage is not applied thereto and scatter light when voltage is applied thereto (see, for example, "Liquid Crystals", Vol. 29, pp. 295-300, 2002, and "Journal of Materials Chemistry", Vol. 13, pp. 2870-2874, 2003).

However, these methods are not widely used because the light modulating materials employing the methods are white when they scatter light, and have poor light-shading properties.

In addition, in guest-host liquid crystal systems using dichroic dyes (see, for example, "Liquid Crystal Handbook" edited by the liquid crystal handbook editorial committee, Maruzen p. 498, 2000), when a concentration of a dye which resides between transparent electrodes is controlled so that the light transmittance in a transparent state is 60%, the light transmittance when it is changed to a colored state due to the application of voltage, is about 30%. Thus, this system has a poor shading property between these states.

SUMMARY OF THE INVENTION

In accordance with the above circumstances, the present invention provides a light modulating material capable of supplying a predetermined light modulating property over a long period of time regardless of the conditions of incident light.

Namely, the invention provides (1) a light modulating material comprising:

a first liquid crystal layer which comprises a dichroic dye and changes from a colorless transparent state to a colored transparent state when voltage is applied thereto; and a second liquid crystal layer which changes from a colorless transparent state to a white scattered state when voltage is applied thereto, wherein the first liquid crystal layer and the second liquid crystal layer are layered together and the second liquid crystal layer is provided closer to a surface of the light modulating material on which light is incident compared to the first liquid crystal layer.

The invention further provides (2) a light modulating material of the item (1), wherein the first liquid crystal layer comprises a vertical alignment film.

The invention further provides (3) a light modulating material of any one of the items (1) and (2), wherein the dichroic dye has a positive order parameter.

The invention further provides (4) a light modulating material of any one of the items (1) to (3), wherein the first liquid crystal layer further comprises a chiral reagent.

The invention further provides (5) a light modulating material of the item (4), wherein an amount of the chiral reagent is 0.1 to 10% by mass relative to a total mass of the first liquid crystal layer.

The invention further provides (6) a light modulating material of any one of the items (1) to (5), wherein the second liquid crystal layer is a polymer dispersed liquid crystal layer which comprises a polymer material.

The invention furthermore provides (7) a light modulating material of any one of the items (1) to (6), further comprising:

a pair of electrode substrates between which the first liquid crystal layer and the second liquid crystal layer are interposed; and a transparent substrate which is interposed between the first liquid crystal layer and the second liquid crystal layer.

According to the invention, a light modulating material capable of supplying a predetermined light modulating property over a long period of time regardless of an incident light condition can be provided.

BRIEF DESCRIPTION OF THE DRAWINGS

FIG. 1A illustrates the alignment of the liquid crystals and dichroic dyes when voltage is not applied to the liquid crystal layer, and FIG. 1B illustrates the alignment of the liquid crystals and dichroic dyes when voltage is applied to the liquid crystal layer.

DETAILED DESCRIPTION OF THE INVENTION

The light modulating material of the invention includes: a first liquid crystal layer which has at least a dichroic dye and changes from a colorless transparent state to a colored transparent state when voltage is applied thereto; and a second liquid crystal layer which changes from a colorless transparent state to a white scattered state when voltage is applied thereto, in which the first liquid crystal layer and the second liquid crystal layer are layered together and the second liquid crystal layer is provided closer to a surface of the light modulating material on which light is incident compared to the first liquid crystal layer.

The reason why the light modulating material of the invention is capable of providing a predetermined light modulating property over a long period of time regardless of an incident light condition is assumed as follows. Note that, the invention is not restricted for the following reason.

When voltage is applied to a light modulating material of the invention, since a second liquid crystal layer changes from a colorless transparent state to a white scattered state, light that enters the light modulating material from the second liquid crystal layer side of the material is scattered by the second liquid crystal layer.

Thus, in the light modulating material of the invention, the light that reaches a first liquid crystal layer of the material is backscattered light. Therefore, exposure of the first liquid crystal layer to direct sunlight and the like can be reduced so that light discoloration of the dichroic dye included in the first liquid crystal layer can be prevented. As a result, the light modulating property can be maintained over a long period of time even when the light modulating material is used outside.

In addition, since modulation of the light that enters the first liquid crystal layer is performed by using the backscattered light, the directivity of the light that enters the first liquid crystal layer is reduced. Therefore, if, for example, antidazzling is required in respect to sunlight, substantially constant light modulating properties can be ensured regardless of the time of year or the time of day.

The light modulation when a polymer dispersed liquid crystal is applied to the second liquid crystal layer of a light modulating material according to an embodiment of the invention will be described with reference to the drawings.

Figure 1A:
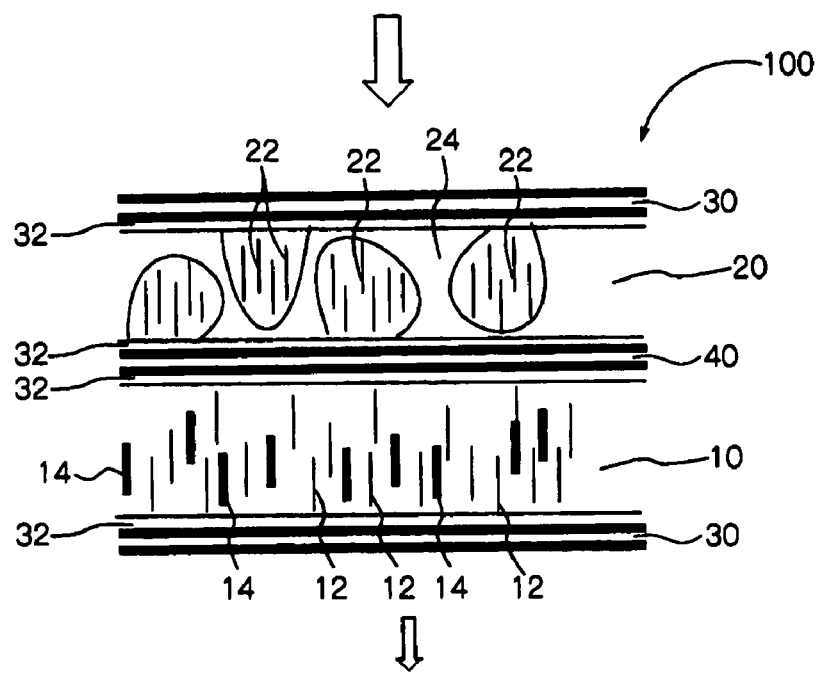
FIGS. 1A and 1B illustrate alignment of liquid crystals and dichroic dyes in a liquid crystal layer according to the invention.
Figure 1B:
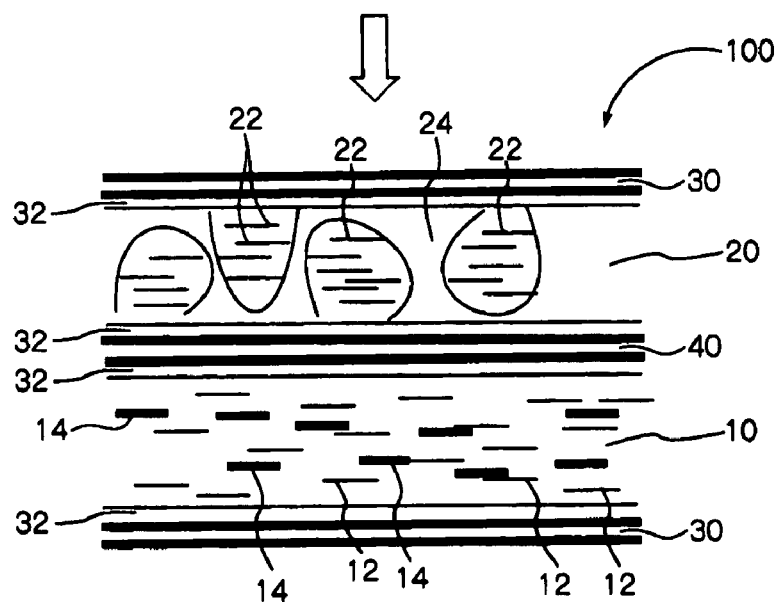

FIG. 1A illustrates alignment of liquid crystals and dichroic dyes when voltage is not applied to the light modulating material, and FIG. 1B illustrates the alignment of the liquid crystals and dichroic dyes when voltage is applied the material. FIGS. 1A and 1B each illustrate a light modulating material 100 in which a first liquid crystal layer 10 and a second liquid crystal layer 20 are interposed between a pair of electrode substrates 30. However, a plurality of pairs of electrode substrates 30 may be provided.

The first liquid crystal layer 10 has at least liquid crystal molecules 12 and dichroic dyes 14. The second liquid crystal layer 20 has at least liquid crystal molecules 22 and a polymer material 24. In FIGS. 1A and 1B, the upper arrows each denote a direction of a light beam entering the light modulating material. Further, in FIG. 1A, the lower arrow denotes a direction of the light that penetrates the light modulating material.

As shown in FIG. 1A, when voltage is not applied, liquid crystal molecules 12 and 22 are vertically aligned to the electrode substrates 30 by means of alignment films 32 that are provided on the electrode substrates 30. Accordingly, dichroic dyes 14 of the first liquid crystal layer 10 are vertically aligned. When the dichroic dyes 14 has a positive (+) order parameter, the first liquid crystal layer is transparent in the alignment state of FIG. 1A.

When the liquid crystal molecules 22 and the polymer material 24 are selected so that a refractive index ($n\|$) in a major axis direction of the liquid crystal molecule 22 that is included in the second liquid crystal layer 20 is substantially identical to a refractive index ($n_p$) of the polymer material 24, a difference in refractive index of the liquid crystal molecules 22 and that of the polymer material 24 is reduced, thus preventing light from scattering and allowing the light to penetrate the liquid crystal layer. Accordingly, the second liquid crystal layer 20 becomes transparent.

As a result, when voltage is not applied as shown in FIG. 1A, the first liquid crystal layer 10 and the second liquid crystal layer 20 are both transparent, Thus, the light modulating material 100 in which the first liquid crystal layer 10 and the second liquid crystal layer 20 are layered is transparent. In addition, electric power consumption of the material can be reduced because the material is already transparent when voltage is not applied thereto.

Meanwhile, since the liquid crystal molecules 12 and 22 of the first liquid crystal layer 10 and the second liquid crystal layer 20 each have a negative (−) dielectric anisotropy, the liquid crystal molecules 12 and 22 are aligned parallel to the electrode substrates 30 when voltage is applied to the material, as shown in FIG. 1B.

Accordingly, in the second liquid crystal layer 20, a refractive index ($n\perp$) in a minor axis direction of the liquid crystal molecules 22 and a refractive index ($n_p$) of the polymer material 24 differ from each other, and light is thus scattered to incur a scattered state. As a result, when voltage is applied to the light modulating material as shown in FIG. 1B, light that enters the second liquid crystal layer 20 is scattered, and the resultant backscattered light reaches the first liquid crystal layer 10.

In the first liquid crystal layer 10, the dichroic dyes 14 are aligned parallel with respect to the alignment of the liquid crystal molecules 12. The dichroic dyes 14 absorb the backscattered light to make the light modulating material colored.

As a result, when voltage is applied as shown in FIG. 1B, the second liquid crystal layer 20 is in a scattered state and the first liquid crystal layer 10 is in a colored state. Accordingly, the light modulating material 100, in which the first liquid crystal layer 10 and the second liquid crystal layer 20 are layered, is in a colored scattered state so as to block light.

Hereinafter, a detailed description will be given to the light modulating material of the invention.

First Liquid Crystal Layer

The first liquid crystal layer according to the invention is a liquid crystal layer of guest-host liquid crystal system that includes a dichroic dye. Further, the first liquid crystal layer may be a White-Taylor type. When voltage is applied thereto, the first liquid crystal layer changes from a colorless transparent state to a colored transparent state.

Host Liquid Crystal

The host liquid crystal, which can be used in the light modulating material of the invention, is defined as a compound that changes the alignment thereof due to an electric field and controls the alignment of the dichroic dye dissolved as the guest.

The host liquid crystal which can be used in the invention is not limited as long as the liquid crystal can coexist with the dichroic dye. However, in a case of a nematic liquid crystal, voltage that is required to change the alignment is lower than that of a smectic liquid crystal. In addition, in a case where the nematic liquid crystal is combined with a chiral reagent, a spiral structure is formed and a display property is improved.

Specific examples of the nematic liquid crystal compound include azomethine compounds, cyanobiphenyl compounds, cyano-phenyl esters, fluorine-substituted phenyl esters, cyclohexane carboxylic acid phenyl esters, fluorine-substituted cyclohexane carboxylic acid phenyl esters, cyanophenylcyclohexane, fluorine-substituted phenyl cyclohexane, cyano-substituted phenylpyrimidine, fluorine-substituted phenylpyrimidine, alkoxy-substituted phenylpyrimidine, fluorine-substituted and alkoxy-substituted phenylpyrimidine, phenyldioxane, tolan compounds, fluorine-substituted tolan compounds, and alkenylcyclohexylbenzonitrile. Further, liquid crystal compounds that are disclosed in pages 154 to 192 and 715 to 722 of "Liquid Crystal Device Handbook" (edited by the 142nd committee in Japan Society for the Promotion of Science, the Nikkan Kogyo Shimbun Ltd., 1989) can be used. Examples of commercially available liquid crystals include ZLI-4692, MLC-6267, 6284, 6287, 6288, 6406, 6422, 6423, 6425, 6435, 6437, 7700, 7800, 9000, 9100, 9200, 9300, and 10000 (all trade names, manufactured by Merck & Co., Inc.); LIXON 5036xx, 5037xx, 5039xx, 5040xx, and 5041xx (all trade names, manufactured by Chisso Corporation); and HA-11757 and CA-32150 (both trade names, manufactured by ADEKA Corporation).

The host liquid crystal that is used in the invention preferably has a negative dielectric anisotropy. In the invention, it is preferable that the liquid crystal having a negative dielectric anisotropy be combined with an alignment film for vertical alignment.

In order to obtain the liquid crystal having a negative dielectric anisotropy, it is necessary for the liquid crystal molecule to have a structure in which the dielectric anisotropy in a minor axis direction is larger than that in a major axis direction. Examples of the liquid crystal having the negative dielectric anisotropy include liquid crystals disclosed in pages 4 to 9 of "Monthly Display" (April, 2000) and "Syn Lett.", Vol. 4, pp. 389-396, 1999. Examples of commercially available liquid crystals having the negative dielectric anisotropy include ZLI-2806, MLC-6608, 6609, and 6610, MLC-6882, MLC-6886, MLC-7026-000, MLC-7026-100, and MLC-7029 (all trade names, manufactured by Merck & Co., Inc.).

In addition, the light modulating material of the invention can also use a liquid crystal exhibiting a dual frequency addressing property. A dual frequency addressable liquid crystal is a liquid crystal, which exhibits positive dielectric anisotropy when the frequency of the electric field applied to the liquid crystal is a low frequency area, and the dielectric anisotropy reverses negative when the frequency of the electric field applied to the liquid crystal is a high frequency area. It is detailed in the pages of 189 to 192 in "Liquid Crystal Device Handbook" (edited by the 142nd committee in Japan Society for the Promotion of Science, the Nikkan Kogyo Shimbun Ltd., 1989). As a specific example thereof, a dual frequency addressable liquid crystal manufactured by Sigma-Aldrich Corp. will be shown.

Liquid Crystal 1 for Dual Frequency Addressing

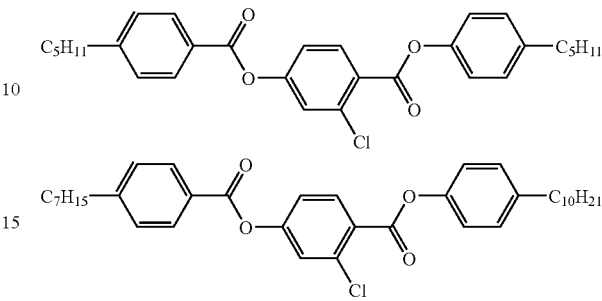

Examples of commercially available dual frequency addressable liquid crystal materials include DF-02XX, DF-05XX, FX-1001, and FX-1002 (all trade names, manufactured by Chisso Corporation), and MLC-2048 (trade name, manufactured by Merck & Co., Inc.).

Specific examples of skeletons of the dual frequency addressable liquid crystal include azomethine compounds, cyanobiphenyl compounds, cyanophenyl esters, fluorine-substituted phenyl esters, cyclohexane carboxylic acid phenyl esters, fluorine-substituted cyclohexane carboxylic acid phenyl esters, cyanophenylcyclohexane, fluorine-substituted phenylcyclohexane, cyano-substituted phenylpyrimidine, fluorine-substituted phenylpyrimidine, alkoxy-substituted phenylpyrimidine, fluorine-substituted and alkoxy-substituted phenylpyrimidine, phenyldioxane, tolan compounds, fluorine-substituted tolan compounds, alkenylcyclohexyl benzonitrile.

When a dual frequency addressable liquid crystal is used, the liquid crystal driving is carried out by applying voltage under switching the different frequencies, which are low frequency and high frequency, to the light modulating material of the invention.

The dual frequency addressable liquid crystal used in the invention may be a mixture of plural liquid crystal compounds. Furthermore, the dual frequency addressable liquid crystal may include such a liquid crystal compound that does not reverse the sign of dielectric anisotropy in the low frequency area and the high frequency area in the applied electric field.

The frequency area in the electric field applied to the liquid crystal is preferably in a range of 0.1 Hz to 10 MHz, and more preferably in a range of 1 Hz to 1 MHz. The electric field used as a low frequency area is in a range of 0.1 Hz to 100 kHz, preferably in a range of 1 Hz to 10 kHz, and more preferably in a range of 10 Hz to 10 kHz. The electric field used as a high frequency area is in a range of 100 Hz to 10 MHz, preferably in a range of 100 Hz to 1 MHz, and more preferably in a range of 1 kHz to 1 MHz.

It is preferable that the host liquid crystal applied to the first liquid crystal layer which changes its state between the colored state and the transparent state have a small absolute value of refractive index anisotropy ($\Delta n$). When the phase transition method is used as a method to switch a colored state and a transparent state, a liquid crystal has the small absolute value of $\Delta n$, and preferably $\Delta n$=0.1 or less. It is because the waving guide in the helical structure is controlled to decrease optical leakage when $\Delta n$ is small, resulting in the improvement in the light modulating property.

Refractive index anisotropy (Δn) herein is defined as the difference between the refractive index (n∥) in the major axis direction of the liquid crystal molecule and the refractive index (n⊥) in the minor axis direction of the liquid crystal molecule.

$$\Delta n = n\| - n\bot$$

Dichroic Dye

In the light modulating material of the invention, the dichroic dye is defined as a compound which is dissolved in a host liquid crystal and has a function of absorbing light. When a dichroic dye having a high dichromatic ratio is used, high contrast can be realized. However, in the invention, the dichromatic ratio of the dichroic dye is not particularly limited.

While the absorption maximum and the absorbing band of the dichroic dye are not particularly restricted, it is preferred that the dye has an absorption maximum in a yellow region (Y), a magenta region (M) or a cyan region (C). Moreover, two or more kinds of dichroic dyes may be used, and it is preferable to use a mixture of dichroic dyes which have the maximum absorption in Y, M, and C. As for the method of carrying out the full-color display by mixing the yellow dye, the magenta dye, and the cyan dye, the detail is described in "Color Chemistry" (written by Sumio Tokita, Maruzen, 1982). Here, the yellow region means in a range of 430 to 490 nm, the magenta region in a range of 500 to 580 nm, and the cyan region in a range of 600 to 700 nm.

Next, a chromophore to be used for the dichroic dye of the invention will be described.

Any chromophoric group of the dichroic dye may be used. Examples thereof include azo dyes, anthraquinone dyes, perylene dyes, merocyanine dyes, azomethine dyes, phthaloperylene dyes, indigo dyes, azulene dyes, dioxadine dyes, polythiophene dyes, and phenoxazine dyes. Preferred are azo dyes, anthraquinone dyes, and phenoxazine dyes, and particularly preferred are anthraquinone dyes and phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

Examples of the cyclic structure included in the azo dye may include heterocyclic rings (such as a quinoline ring, a pyridine ring, a thiazole ring, a benzothiazole ring, an oxazole ring, a benzoxazole ring, an imidazole ring, a benzoimidazole ring, a pyrimidine ring, or the like) in addition to aromatic groups (a benzene ring, a naphthalene ring or the like).

The substituent for the anthraquinone dye is preferably those having an oxygen atom, sulfur atom, or nitrogen atom and includes, for example, an alkoxy group, an aryloxy group, an alkylthio group, an arylthio group, an alkylamino group, and an arylamino group. The number of substitution of the substituent may be of any number and di-substitution, tri-substitution, or tetrakis-substitution is preferred, and di-substitution and tri-substitution are particularly preferred. The substitution of the substituent may be at any position and preferred structure is 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution.

The substituent for the phenoxazone dye (phenaxazin-3-one) is preferably those having an oxygen atom, sulfur atom, or nitrogen atom and includes, for example, an alkoxy group, an aryloxy group, an alkylthio group, an arylthio group, an alkylamino group, and an arylamino group.

For the first liquid crystal layer of the invention, dichroic dyes each having a substituent represented by the following formula (1) may be applied.

$$-(\text{Het})_j - \{(B^1)_p - (Q^1)_q - (B^2)_r\}_n - C^1 \qquad \text{Formula (1)}$$

In the formula, Het is an oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p - (Q^1)_q - (B^2)_r\}$ may be the same or different.

Het is an oxygen atom or sulfur atom, particularly preferably a sulfur atom.

$B^1$ and $B^2$ each independently represent an arylene group, a heteroarylene group, or a bivalent cyclic aliphatic hydrocarbon group, and any group may have or not have a substituent.

The arylene group represented by $B^1$ and $B^2$ is preferably an arylene group having 6 to 20 carbon atoms, and more preferably 6 to 10 carbon atoms. Specific examples of preferred arylene group include, for example, groups comprising a benzene ring, a naphthalene ring, and an anthracene ring, particularly preferably a benzene ring and a substituted benzene ring, and further preferably 1,4-phenylene group.

The heteroarylene group represented by $B^1$ and $B^2$ is preferably a heteroarylene group having 1 to 20 carbon atoms, and more preferably a heteroarylene group having 2 to 9 carbon atoms. Specific examples of preferred heteroarylene group include a group comprising pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, and triazole ring, as well as a heteroarylene group obtained by eliminating hydrogen atoms each by one from two carbon atoms in a condensed ring formed by ring condensation thereof.

The bivalent cycloaliphatic hydrocarbon group represented by $B^1$ and $B^2$ is preferably a bivalent cycloaliphatic hydrocarbon group having preferably 3 to 20 carbon atoms, more preferably 4 to 10 carbon atoms. Specific examples of preferred bivalent cycloaliphatic hydrocarbon group include a cyclohexanediyl group and a cyclopentanediyl group, more preferably a cyclohexane-1,2-diyl group, a cyclohexane-1,3-diyl group, a cyclohexane-1,4-diyl group, and a cyclopentane-1,3-diyl group, and particularly preferably a (E)-cyclohexane-1,4-diyl group.

The arylene group, the heteroarylene group, and the bivalent cyclic aliphatic hydrocarbon group represented by $B^1$ and $B^2$ may further have a substituent, and the substituent includes the following substituent group V.

Examples of the substituent group V include halogen atoms (such as chlorine, bromine, iodine, or fluorine), a mercapto group, a cyano group, a carboxyl group, a phosphoric group, a sulfo group, a hydroxy group, a carbamoyl group having 1 to 10 carbon atoms, preferably 2 to 8 carbon atoms, and more preferably 2 to 5 carbon atoms (such as a methyl carbamoyl group, an ethyl carbamoyl group, or a morpholinocarbamoyl group), a sulfamoyl group having 0 to 10 carbon atoms, preferably 2 to 8 carbon atoms, and more preferably 2 to 5 carbon atoms (such as a methylsulfamoyl group, an ethylsulfamoyl group, or a piperidinosulfamoyl group), a nitro group, an alkoxy group having 1 to 20 carbon atoms, preferably 1 to 10 carbon atoms, and more preferably 1 to 8 carbon atoms (such as a methoxy group, an ethoxy group, a 2-methoxyethoxy group, or a 2-phenylethoxy), an aryloxy group having 6 to 20 carbon atoms, preferably 6 to 12 carbon atoms, and more preferably 6 to 10 carbon atoms (such as a phenoxy group, a p-methylphenoxy group, a p-chlorophenoxy group, or a naphthoxy group), an acyl group having 1 to 20 carbon atoms, preferably 2 to 12 carbon atoms, and more preferably 2 to 8 carbon atoms (such as an acetyl group, a benzoyl group, or a trichloroacetyl group), an acyloxy group having 1 to 20 carbon atoms, preferably having 2 to 12 carbon atoms, and more preferably 2 to 8 carbon atoms (such as an acetyloxy group or a benzoyloxy group), an acylamino group having 1 to 20 carbon atoms, preferably having 2 to 12 carbon atoms, and more preferably 2 to 8 carbon atoms (such as an acetylamino group), a sulfonyl group having 1 to 20 carbon atoms, preferably 1 to 10, and more preferably 1 to 8 carbon atoms (such as a methanesulfonyl group, an ethanesulfonyl group, or a benzenesulfonyl group), a sulfinyl groups having 1 to 20 carbon atoms, preferably 1 to 10, and more preferably 1 to 8 carbon atoms (such as a methanesulfinyl group, an ethanesulfinyl group, or a benzenesulfinyl group), a substituted or unsubstituted amino group having 1 to 20 carbon atoms, preferably 1 to 12 carbon atoms, and more preferably 1 to 8 carbon atoms (such as an amino group, a methylamino group, a dimethylamino group, a benzylamino group, an anilino group, a diphenylamino group, a 4-methylphenylamino group, a 4-ethylphenylamino group, a 3-n-propylphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethylphenylamino group, a 4-trifluoromethylphenylamino group, a 2-pyridylamino group, a 3-pyridylamino group, a 2-thiazolylamino group, a 2-oxazolylamino group, a N,N-methylphenylamino group, or a N,N-ethylphenylamino group), an ammonium group having 0 to 15 carbon atoms, preferably 3 to 10 carbon atoms, more preferably 3 to 6 carbon atoms (such as a trimethylammonium group or a triethylammonium group), a hydrazino group having 0 to 15 carbon atoms, preferably 1 to 10 carbon atoms, and more preferably 1 to 6 carbon atoms (such as a trimethylhydrazino group), an ureido group having 1 to 15 carbon atoms, preferably 1 to 10 carbon atoms, and more preferably 1 to 6 carbon atoms (such as a ureido group or a N,N-dimethylureido group), an imido group having 1 to 15 carbon atoms, preferably 1 to 10 carbon atoms, and more preferably 1 to 6 carbon atoms (such as a succinimide group), an alkylthio group having 1 to 20 carbon atoms, preferably 1 to 12 carbon atoms, and more preferably 1 to 8 carbon atoms (such as a methylthio group, an ethylthio group, or a propylthio group), an arylthio group having 6 to 80 carbon atoms, preferably 6 to 40 carbon atoms, and more preferably 6 to 30 carbon atoms (such as a phenylthio group, a p-methylphenylthio group, a p-chlorophenylthio group, a 2-pyridylthio group, a 1-naphthylthio group, a 2-naphthylthio group, a 4-propylcyclohexyl-4'-biphenylthio group, a 4-butylcyclohexyl-4'-biphenylthio group, a 4-pentylcyclohexyl-4'-biphenylthio group, or a 4-propylphenyl-2-ethynyl-4'-biphenylthio group), a heteroarylthio group having 1 to 80 carbon atoms, preferably 1 to 40 carbon atoms, and more preferably 1 to 30 carbon atoms (such as a 2-pyridylthio group, a 3-pyridylthio group, a 4-pyridylthio group, a 2-quinolylthio group, a 2-furylthio group, or a 2-pyrrolylthio group), an alkoxycarbonyl group having 2 to 20 carbon atoms, preferably 2 to 12 carbon atoms, and more preferably 2 to 8 carbon atoms (such as a methoxycarbonyl group, an ethoxycarbonyl group, or a 2-benzyloxycarbonyl group), an aryloxycarbonyl group having 6 to 20 carbon atoms, preferably 6 to 12 carbon atoms, and more preferably 6 to 10 carbon atoms (such as a phenoxycarbonyl group), an unsubstituted alkyl group having 1 to 18 carbon atoms, preferably 1 to 10 carbon atoms, and more preferably 1 to 5 carbon atoms (such as a methyl group, an ethyl group, a propyl group, or a butyl group), a substituted alkyl group having 1 to 18 carbon atoms, preferably 1 to 10 carbon atoms, and more preferably 1 to 5 carbon atoms {such as a hydroxymethyl group, a trifluoromethyl group, a benzyl group, a carboxyethyl group, an ethoxycarbonylmethyl group, an acetylaminomethyl group, moreover, in here, an unsaturated hydrocarbon group having 2 to 18 carbon atoms, preferably 3 to 10 carbon atoms, and more preferably 3 to 5 carbon atoms (such as a vinyl group, an ethynyl group, a 1-cyclohexenyl group, a benzylidine group, or a benzylidene group) will be included in the substituted alkyl groups}, a substituted or unsubstituted aryl group having 6 to 20 carbon atoms, preferably 6 to 15 carbon atoms, and more preferably 6 to 10 carbon atoms (such as a phenyl group, a naphthyl group, a p-carboxyphenyl group, a p-nitrophenyl group, a 3,5-dichlorophenyl group, a p-cyanophenyl group, a m-fluorophenyl group, a p-tolyl group, a 4-propylcyclohexyl-4'-biphenyl group, a 4-butylcyclohexyl-4'-biphenyl group, a 4-pentylcyclohexyl-4'-biphenyl group, or a 4-propylphenyl-2-ethynyl-4'-biphenyl group), a substituted or unsubstituted heteroaryl group having 1 to 20 carbon atoms, preferably 2 to 10 carbon atoms, and more preferably 4 to 6 carbon atoms (such as a pyridyl group, a 5-methylpyridyl group, a thienyl group, a furyl group, a morpholino group, or a tetrahydrofurfuryl group).

Those substituent groups V may have a structure in which a benzene ring or a naphthalene ring is condensed. Further, the substituent illustrated by the explanation for V explained so far may further be substituted on the substituents described above.

Among the substituent groups V, examples of preferred substituents include the above-described alkyl groups, aryl groups, alkoxy groups, aryloxy groups, halogen atoms, amino groups, substituted amino groups, hydroxy groups, and alkylthio groups, and further preferably alkyl groups, aryl groups, and halogen atoms.

$Q^1$ represents a bivalent linking group. Preferable is a connecting group which consists of the atomic group composed of at least one atom selected from the carbon atom, the nitrogen atom, the sulfur atom, and the oxygen atom. Further, the bivalent linking group represented by $Q^1$ preferably includes bivalent linking groups having 0 to 60 carbon atoms, including an alkylene group having preferably 1 to 20 carbon atoms and more preferably 1 to 10 carbon atoms (such as a methylene group, an ethylene group, a propylene group, a butylene group, a pentylene group, or a cyclohexyl-1,4-diyl group), an alkenylene group having preferably 2 to 20 carbon atoms and more preferably 2 to 10 carbon atoms (such as an ethenylene group), an alkynylene groups having preferably 2 to 20 carbon atoms and more preferably 2 to 10 carbon atoms (such as an ethynylene group), an amide group, an ether group, an erter group, a sulfoamide group, a sulfonate group, an ureido group, a sulfonyl group, a sulfinyl group, a thioether group, a carbonyl group, an —NR— group (herein, R represents a hydrogen atom, an alkyl group, or an aryl group. An alkyl group represented by R is an alkyl group having preferably 1 to 20 carbon atoms and more preferably 1 to 10 carbon atoms. An aryl group represented by R is an aryl group having preferably 6 to 14 carbon atoms and more preferably 6 to 10 carbon atoms), an azo group, an azoxy group, and a bivalent heterocyclic group (a bivalent heterocyclic group having preferably 2 to 20 carbon atoms and more preferably 4 to 10 carbon atoms, for example, piperazine-1,4-diyl) or as a combination of two or more of them.

As a bivalent linking group represented by $Q^1$, an alkylene group, an alkenylene group, an alkynylene group, an ether group, a thioether group, an amide group, an ester group, a carbonyl group, and a combination of two or more of them are preferable.

$Q^1$ may further have a substituent, and the substituent group V is enumerated as the substituent.

$C^1$ represents an alkyl group, a cycloalkyl group, an alkoxy group, an alkoxycarbonyl group, an acyl group, or an acyloxy group. The alkyl group, the cycloalkyl group, the alkoxy group, the alkoxycarbonyl group, the acyl group, and the acyloxy group, each of which is represented by $C^1$, also include those groups each having a substituent.

$C^1$ preferably represents an alkyl and a cycloalkyl group having 1 to 30 carbon atoms, more preferably 1 to 12 carbon atoms, and further preferably 1 to 8 carbon atoms (such as a methyl group, an ethyl group, a propyl group, a butyl group, a t-butyl group, an i-butyl group, a s-butyl group, a pentyl group, a t-pentyl group, a hexyl group, a heptyl group, an octyl group, a cyclohexyl group, a 4-methylcyclohexyl group, a 4-ethylcyclohexyl group, a 4-propylcyclohexyl group, a 4-butylcyclohexyl group, a 4-pentylcyclohexyl group, a hydroxymethyl group, a trifluoromethyl group, or a benzyl group), an alkoxy group having 1 to 20 carbon atoms, more preferably 1 to 10 carbon atoms, and further preferably 1 to 8 carbon atoms (such as a methoxy group, an ethoxy group, a 2-methoxyethoxy group, or a 2-phenylethoxy group), an acyloxy group having 1 to 20 carbon atoms, more preferably 2 to 12 carbon atoms, and further preferably 2 to 8 carbon atoms (such as an acetyloxy group or a benzoyloxy group), an acyl group having 1 to 30 carbon atoms, more preferably 1 to 12 carbon atoms, and further preferably 1 to 8 carbon atoms (such as an acetyl group, a formyl group, a pivaloyl group, 2-chloroacetyl group, a stearoyl group, a benzoyl group, or a p-n-octyloxyphenylcarbonyl group), or an alkoxycarbonyl group having 2 to 20 carbon atoms, more preferably 2 to 12 carbon atoms, and further preferably 2 to 8 carbon atoms (such as a methoxycarbonyl group, an ethoxycarbonyl group, or a 2-benzyloxycarbonyl group).

$C^1$ represents particularly preferably an alkyl group or an alkoxy group, and more preferably an ethyl group, a propyl group, a butyl group, a pentyl group, a hexyl group, or a trifluoromethoxy group.

$C^1$ may further have a substituent, and the substituent group V is enumerated as the substituent.

A substituent for the alkyl group represented by $C^1$ preferably includes, among the substituent groups V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the cycloalkyl group represented by $C^1$ preferably includes, among the substituent groups V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl group.

A substituent for the alkoxy group represented by $C^1$ preferably includes, among the substituent groups V, a halogen atom (particularly, a fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the alkoxycarbonyl group represented by $C^1$ preferably includes, among the substituent groups V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the acyl group represented by $C^1$ preferably includes, among the substituent groups V, a halogen atom, a cyano group, a hydroxy group, a carbamoyl group, an alkoxy group, an aryloxy group, an acyl group, an acyloxy group, an acylamino group, an alkylthio group, an arylthio group, a heteroarylthio group, an alkoxycarbonyl group, and an aryloxycarbonyl group.

A substituent for the acyloxy group represented by $C^1$ preferably includes, among the substituent groups V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

j represents 0 or 1, and preferably 0.

p, q and r each independently represent an integer from 0 to 5, and n represents an integer from 1 to 3. The total number of the groups represented by $B^1$ and $B^2$, that is, $(p+r) \times n$ is an integer from 3 to 10, more preferably an integer from 3 to 5. In a case where p, q, or r is 2 or greater, two or more $B^1$, $Q^1$ and $B^2$ may be identical or different with each other respectively, and in a case where n is 2 or greater, $\{(B^1)_p-(Q^1)_q-(B^2)_r\}$ may be identical or different with each other.

Preferable combinations of p, q, r, and n will be described as follows.

(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, t=2, n=1
(vii) p=3, q=1, r=1, n=1
(viii) p=2, q=0, r=2, n=1
(ix) p=1, q=1, r=1, n=2
(x) p=2, q=1, r=1, n=2

Particularly preferable combinations are (i) p=3, q=0, r=0, n=1; (iv) p=2, q=0, r=1, n=1; and (v) p=2, q=1, r=1, n=1.

Further, $-\{(B^1)_p-(Q^1)_q-(B^2)_r\}_n-C^1$ preferably has a partial structure to exhibit the liquid crystal property. Herein, the liquid crystal may be any phase, preferably is a nematic liquid crystal, a smectic liquid crystal, and a discotic liquid crystal, and particularly preferably a nematic liquid crystal.

Specific examples of $-\{(B^1)_p-(Q^1)_q-(B^2)_r\}_n-C^1$ are shown below, but the invention should not be limited to them (in the following chemical formulae, the wavy line shows the connecting position).

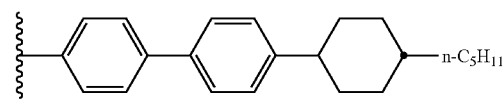

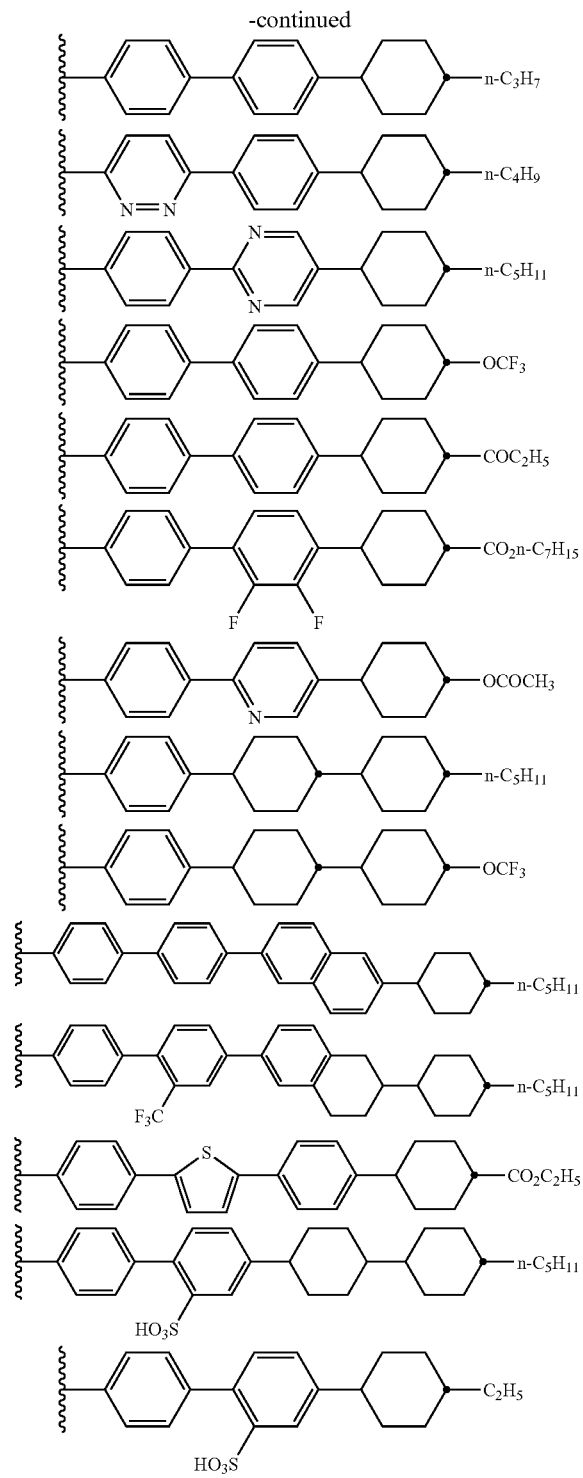

a cyclohexane-1,4-diyl group, $C^1$ represents an alkyl group, and j=1, p=2, q=0, r=1, and n=1.

[2] A structure in which Het represents a sulfur atom, $B^1$ represents an aryl group or a heteroaryl group, $B^2$ represents a cyclohexane-1,4-diyl group, $C^1$ represents an alkyl group, and j=1, p=1, q=0, r=2 and n=1.

Especially preferred structures are:

[1] a structure represented by the following Formula (a-1), in which Het represents a sulfur atom, $B^1$ represents a 1,4-phenylene group, $B^2$ represents a trans-cyclohexyl group, $C^1$ represents an alkyl group (preferably, a methyl group, an ethyl group, a propyl group, a butyl group, a pentyl group, or a hexyl group), and j=1, p=2, q=0, r=1 and n=1; and

[2] a structure represented by the following Formula (a-2), in which Het represents a sulfur atom, $B^1$ represents a 1,4-phenylene group, $B^2$ represents a trans-cylohexane-1,4-diyl group, $C^1$ represents an alkyl group (preferable examples thereof include a methyl group an ethyl group a propyl group a butyl group a pentyl group, or a hexyl group), and j=1, p=1, q=0, r=2 and n=1.

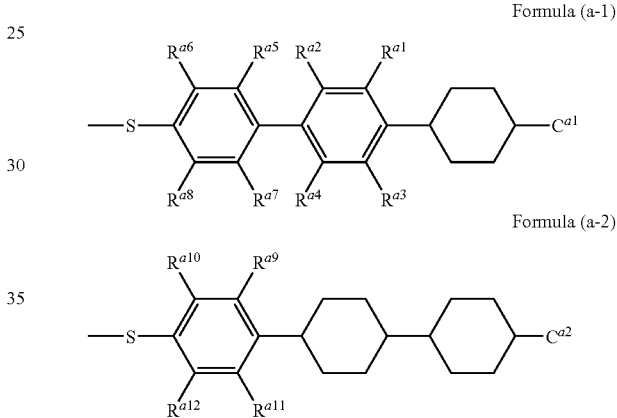

In the Formulae (a-1) and (a-2), $R^{a1}$ to $R^{a2}$ each independently represent a hydrogen atom or a substituent. The substituent includes, for example, a substituent selected from the substituent groups V.

$R^{a1}$ to $R^{a12}$ each independently represent preferably a hydrogen atom, a halogen atom (particularly, a fluorine atom), an alkyl group, an aryl group, and an alkoxy group. Among the alkyl group, aryl group, and alkoxy group represented by $R^{a1}$ to $R^{a12}$, preferred are those identical with the alkyl group, aryl group, and alkoxy group described for the substituent groups V.

In the Formulae (a-1) and (a-2), $C^{a1}$ and $C^{a2}$ each independently represent an alkyl group, and preferably an alkyl group having 1 to 20 carbon atoms, more preferably 1 to 10 carbon atoms, and particularly preferably a methyl group, an ethyl group, a propyl group, a butyl group, a pentyl group, a hexyl group, a heptyl group, an octyl group, or a nonyl group.

Among the Formulae (a-1) and (a-2), $C^{a1}$ and $C^{a2}$, which have a straight chain alkyl group having 3 to 10 carbon atoms, is particularly suitable for use in the light modulating material of the invention because the solubility in the host liquid crystal is improved and the amount of light absorbed in the colored state is increased. The reason is not clarified, but it is guessed that the reason would be in the improvement in the compatibility with the host liquid crystal.

The azo dye may be any of a monoazo dye, a bisazo dye, a trisazo dye, a tetrakisazo dye, and a pentakisazo dye, and preferably a monoazo dye, a bisazo dye, and a trisazo dye.

The dichroic dye used in the invention has preferably one or more, more preferably 1 to 8, further preferably 1 to 4, and particularly preferably 1 to 2 substituents represented by —{($B^1$)$_p$—($Q^1$)$_q$—($B^2$)$_r$}$_n$—$C^1$.

A preferred structure of the substituent represented by the Formula (1) includes combinations described below.

[1] A structure in which Het represents a sulfur atom, $B^1$ represents an aryl group or a heteroaryl group, $B^2$ represents Examples of a ring structure included in the azo dye includes, in addition to aromatic groups (such as a benzene ring, a naphthalene ring, or the like), hetero rings (such as a quinoline ring, a pyridine ring, a thiazole ring, a benzothiazole ring, an oxazole ring, a benzoxazole ring, an imidazole ring, a benzoimidazole ring, a pyrimidine ring, or the like).

The substituent for the anthraquinone dye preferably includes those having an oxygen atom, sulfur atom or nitrogen atom, for example, an alkoxy group, an aryloxy group, an alkylthio group, an arylthio group, an alkylamino group, and an arylamino group.

While the number of substitution for the substituent may be of any number, di-substitution, tri-substitution, and tetra-substitution are preferred, and di-substitution and tri-substitution are particularly preferred. The substitution of the substituent may be at any position adopted, but preferred are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (2), and the phenoxazone dye is more preferably a compound represented by the following Formula (3).

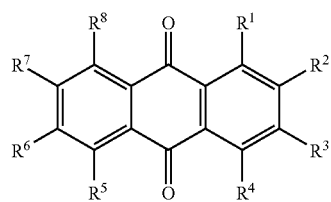

Formula (2)

In the Formula (2), at least one of $R^1$, $R^2$, $R^3$, $R^4$, $R^5$, $R^6$, $R^7$ and $R^8$ represents -(Het)$_j$-{(B$^1$)$_p$—(Q$^1$)$_q$—(B$^2$)$_r$}$_n$—C$^1$, and others each independently represent a hydrogen atom or a substituent.

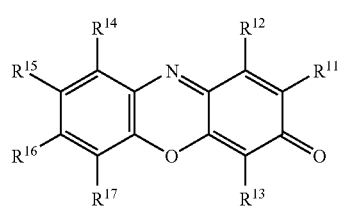

Formula (3)

In the Formula (3), at least one or more of $R^{11}$, $R^{12}$, $R^{13}$, $R^{14}$, $R^{15}$, $R^{16}$, and $R^{17}$, represents -(Het)$_j$-{(B$^1$)$_p$—(Q$^1$)$_q$—(B$^2$)$_r$}$_n$—C$^1$, and the others each independently represent a hydrogen atom or a substituent.

Here, Het, B$^1$, B$^2$, Q$^1$, p, q, r, n, and C$^1$ have the same definitions as Het, B$^1$, B$^2$, Q$^1$, p, q, r, n, and C$^1$ in the Formula (1).

In the Formula (2), examples of the above substituents represented by $R^1$, $R^2$, $R^3$, $R^4$, $R^5$, $R^6$, $R^7$, and $R^8$ include the substituent groups V, preferably include an arylthio group having 6 to 80 carbon atoms, more preferably 6 to 40 carbon atoms, and further preferably 6 to 30 carbon atoms (such as a phenylthio group, a p-methylphenylthio group, a p-chlorophenylthio group, a 4-methylphenylthio group, a 4-ethylphenylthio group, a 4-n-propylphenylthio group, a 2-n-butylphenylthio group, a 3-n-butylphenylthio group, a 4-n-butylphenylthio group, a 2-t-butylphenylthio group, a 3-t-butylphenylthio group, a 4-t-butylphenylthio group, a 3-n-pentylphenylthio group, a 4-n-pentylphenylthio group, a 4-amylpentylphenylthio group, a 4-hexylphenylthio group, a 4-heptylphenylthio group, a 4-octylphenylthio group, a 4-trifluoromethylphenylthio group, a 3-trifluoromethylphenylthio group, a 2-pyridylthio group, a 1-naphthylthio group, a 2-naphthylthio group, a 4-propylcyclohexyl-4'-biphenylthio group, a 4-butylcyclohexyl-4'-biphenylthio group, a 4-pentylcyclohexyl-4'-biphenylthio group, or a 4-propylphenyl-2-ethynyl-4'-biphenylthio group), a heteroarylthio group having 1 to 80 carbon atoms, more preferably 1 to 40 carbon atoms, and further preferably 1 to 30 carbon atoms (such as a 2-pyridylthio group, a 3-pyridylthio group, a 4-pyridylthio group, a 2-quinolylthio group, a 2-furylthio group, or a 2-pyrrolylthio group), a substituted or unsubstituted alkylthio group (such as a methylthio group, an ethylthio group, a butylthio group, or a phenethylthio group), a substituted or unsubstituted amino group (such as an amino group, a methylamino group, a dimethylamino group, a benzylamino group, an anilino group, a diphenylamino group, a 4-methylphenylamino group, a 4-ethylphenylamino group, a 3-n-propylphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethylphenylamino group, a 4-trifluoromethylphenylamino group, a 2-pyridylamino group, a 3-pyridylamino group, a 2-thiazolylamino group, a 2-oxazolylamino group, a N,N-methylphenylamino group, or a N,N-ethylphenylamino group), a halogen atom (such as a fluorine atom or a chlorine atom), a substituted or unsubstituted alkyl group (such as a methyl group or a trifluoromethyl group), a substituted or unsubstituted alkoxy group (such as a methoxy group or a trifluoromethoxy group), a substituted or unsubstituted aryl group (such as a phenyl group), a substituted or unsubstituted heteroaryl group (such as a 2-pyridyl group), a substituted or unsubstituted aryloxy group (such as a phenoxy group), a substituted or unsubstituted heteroaryloxy group (such as a 3-thienyloxy group), and the like.

Each of $R^1$, $R^2$, $R^3$, $R^4$, $R^5$, $R^6$, $R^7$, and $R^8$ is preferably a hydrogen atom, a fluorine atom, a chlorine atom, a substituted or unsubstituted arylthio group, a substituted or unsubstituted alkylthio group, a substituted or unsubstituted amino group, a substituted or unsubstituted alkylamino group, a substituted or unsubstituted arylamino group, a substituted or unsubstituted alkyl group, a substituted or unsubstituted aryl group, a substituted or unsubstituted alkoxy group, or a substituted or unsubstituted aryloxy group, and particularly preferably a hydrogen atom, a fluorine atom, and a substituted or unsubstituted arylthio group, alkylthio group, amino group, alkylamino group, or arylamino group.

Moreover, in the Formula (2), at least one of $R^1$, $R^4$, $R^5$, and $R^8$ is further preferably -(Het)$_j$-{(B$^1$)$_p$—(Q$^1$)$_q$—(B$^2$)$_r$}$_n$—C$^1$.

In the Formula (3), each of the substituents represented by $R^1$, $R^{12}$, $R^3$, $R^{14}$, $R^{15}$, $R^{16}$, or $R^j$ is a halogen atom, an alkyl group, an aryl group, an alkylthio group, an arylthio group, a heterothio group, a hydroxyl group, an alkoxy group, an aryloxy group, a carbamoyl group, an acyl group, an aryloxycarbonyl group, an alkoxycarbonyl group, and an amido group, and particularly preferably hydrogen atom, a halogen atom, an alkyl group, an arylthio group, and an amido group.

$R^{16}$ is preferably an amino group (including an alkylamino group and an arylamino group), a hydroxyl group, a mercapto group, an alkylthio group, an arylthio group, an alkoxy group, or an aryloxy group, and particularly preferably an amino group.

Specific examples of the dichroic dyes which can be used in the invention will be shown below, but the invention should not be limited at all by the following specific examples.

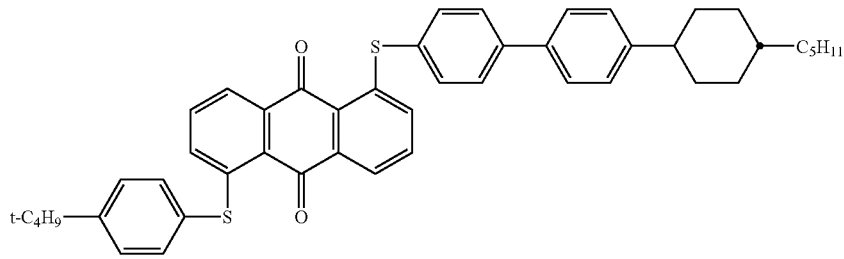
No. 1-1
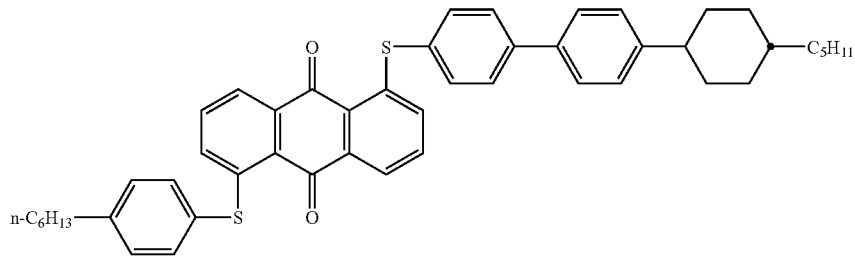
No. 1-2
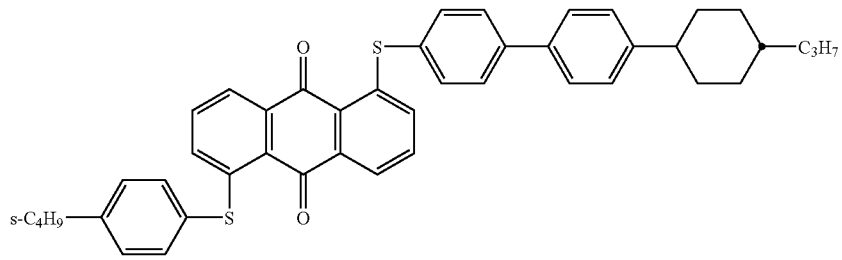
No. 1-3
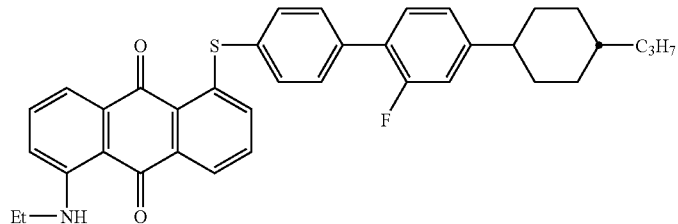
No. 1-4
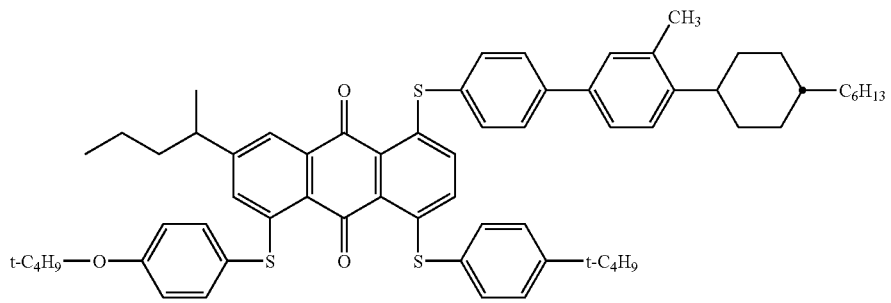
No. 1-5
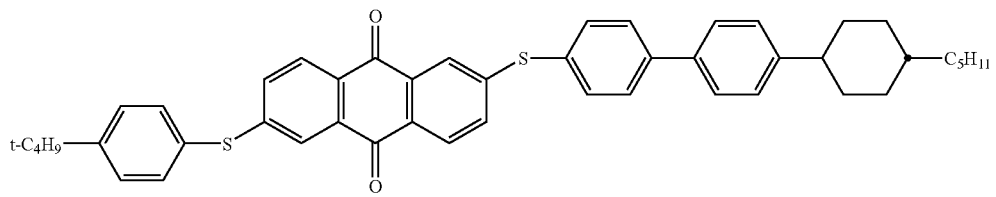
No. 1-6

-continued
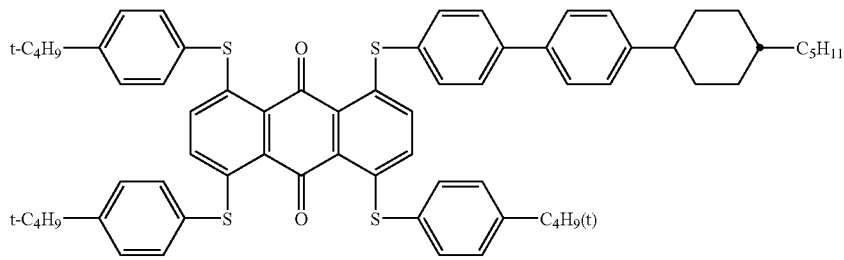
No. 1-7
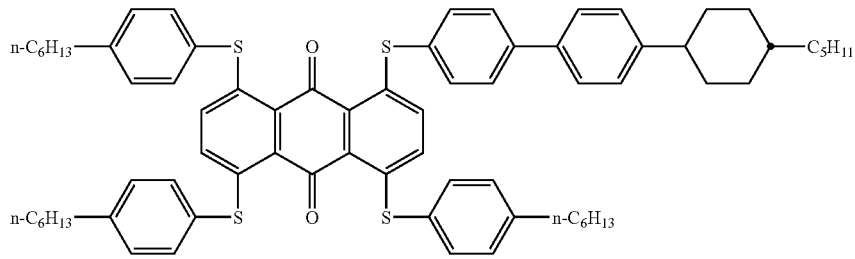
No. 1-8
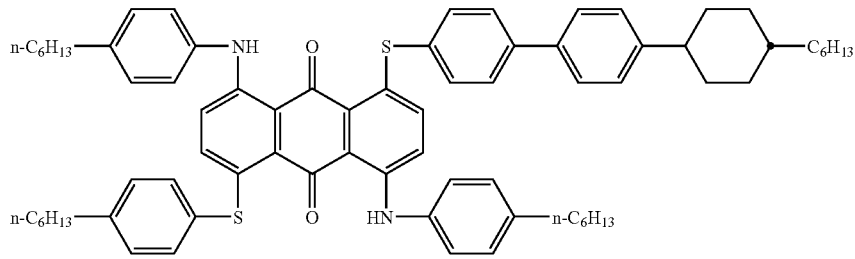
No. 1-9
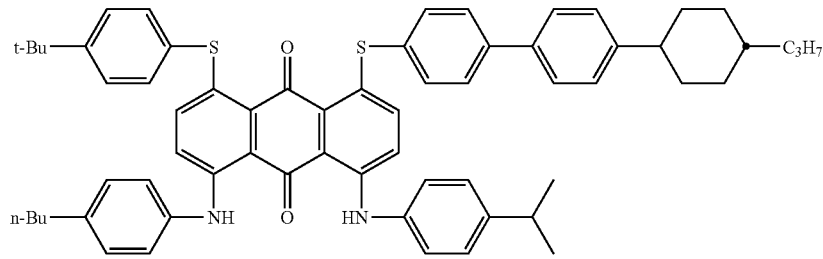
No. 1-10
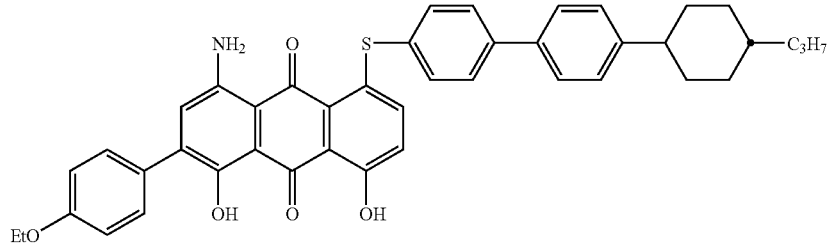
No. 1-11
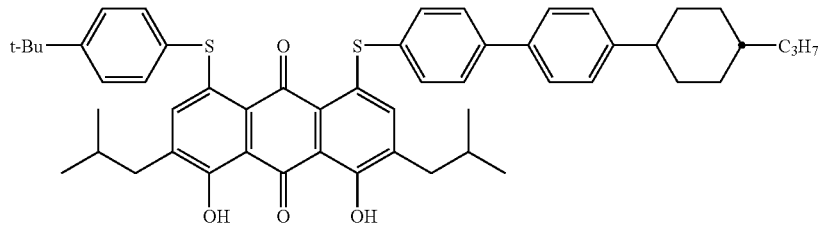
No. 1-12

-continued
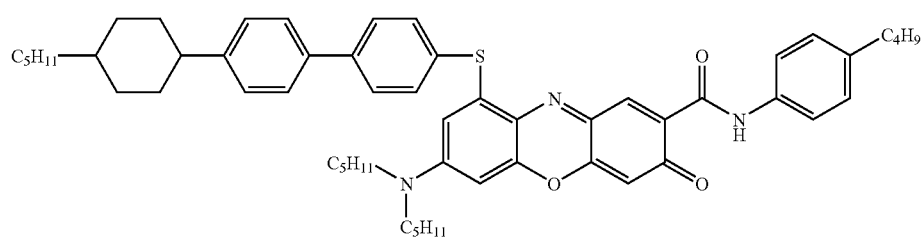
No. 1-13
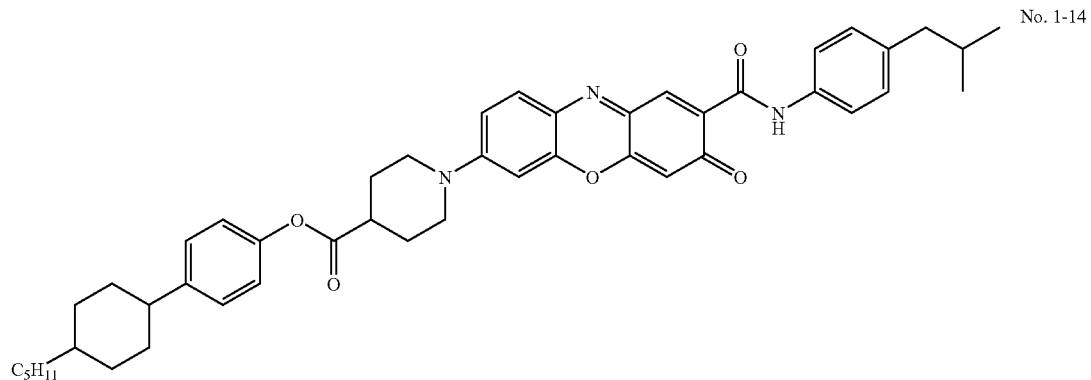
No. 1-14
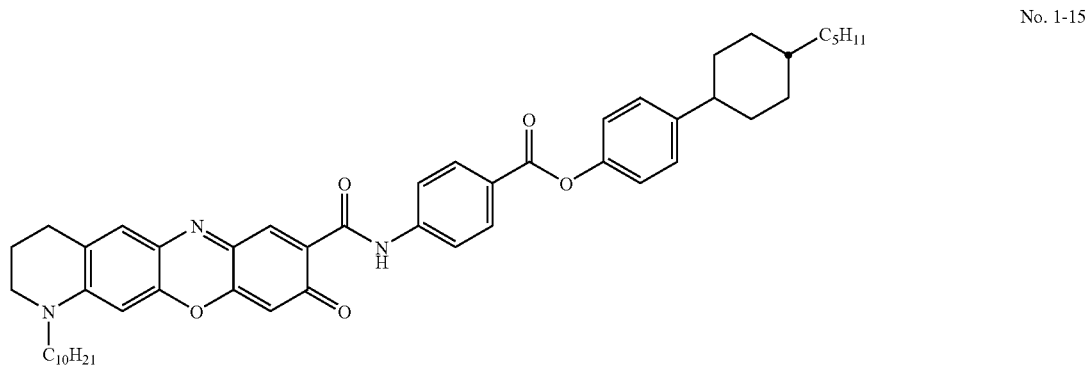
No. 1-15
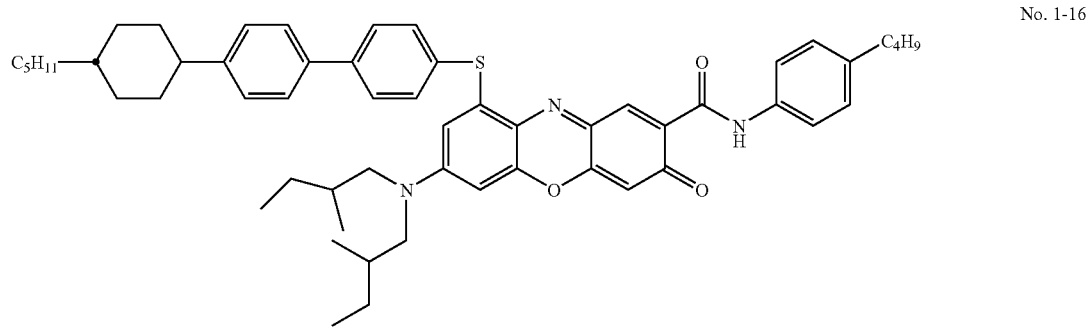
No. 1-16
Specific examples of the azo dichroic dyes are shown below but the invention is not restricted to the following specific examples.
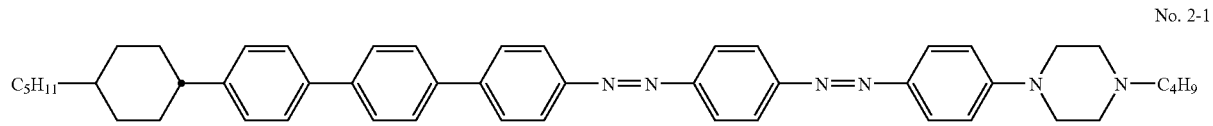
No. 2-1

-continued

No. 2-2

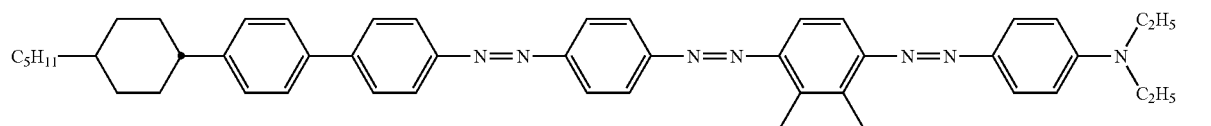

No. 2-3

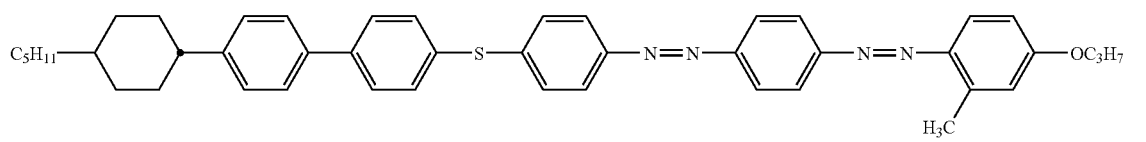

Specific examples of the dioxadine dichroic dyes and merocyanine dichroic dyes usable in the invention are shown below but the invention is not restricted to the following specific examples.

and the absorption spectrums of the liquid crystal cell which encloses the liquid crystal composition are measured respectively, and the dye density is decided which is necessary to provide the desired optical density as a liquid crystal cell.

No. 3-1

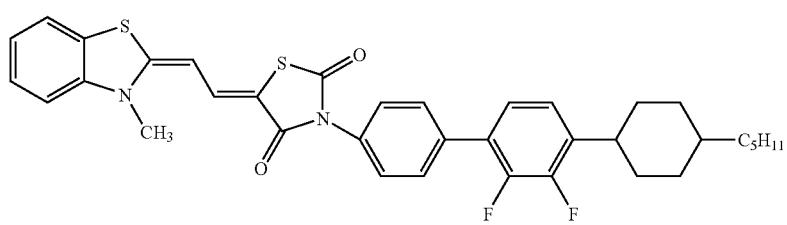

No. 3-2

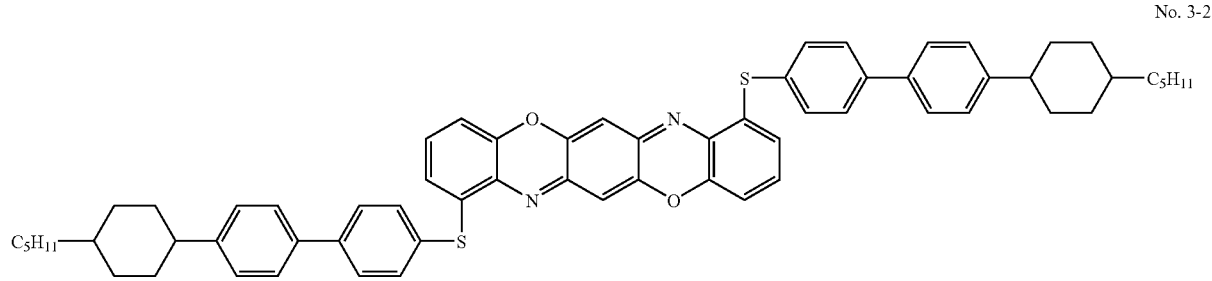

The dichroic dyes, which have substituents and are represented by the Formula (1), can be synthesized by combining the known methods. For example, they can be synthesized according to the methods described in JP-A No. 2003-192664 and the like.

While the contents of a host liquid crystal and a dichroic dye are not particularly restricted in the first liquid crystal layer of the invention, the amount of the dichroic dye is preferably 0.1 to 15% by mass relative to the amount of the host liquid crystal, more preferably 0.5 to 10% by mass, and further preferably 1 to 8% by mass relative to the amount of the host liquid crystal. Moreover, as for the content of the host liquid crystal and the dichroic dye, it is desirable that the liquid crystal composition including both materials is made, Other Additives In the light modulating material of the invention, a compound which does not exhibit the liquid crystallinity may be added for the purpose of changing the physical properties of the host liquid crystal within the desired range (for instance, for the purpose of making the temperature range of the liquid crystallinity within the desired range). Moreover, compounds including a chiral compound, an ultraviolet absorbent, and/or an antioxidant may be further included. Examples of such additives include chiral reagents for TN and STN, which are described in the pages of 199 to 202 of "Liquid Crystal Device Handbook" (edited by the 142nd Committee in Japan Society for the Promotion of Science, Nikkan Kogyo Shimbun, Ltd., 1989).

When a chiral reagent is added, the cholesteric liquid crystal phase is formed, and the dichroic dye, which is dissolved in the nematic liquid crystal, will be spirally arranged. Therefore, it is suitable because both polarized lights can be absorbed for linear polarized lights being orthogonal to each other, and the absorbed amount of light in the colored state is increased. On the other hand, when the nematic liquid crystal layer which has been made in uniaxial alignment is used, as for light, only half theoretical will be absorbed.

It is preferable that the concentration of the chiral reagent to be added is controlled so that a selective reflection band of the chiral reagent is within a near infrared region, so that a pitch of the spiral structure of the liquid crystal is shortened, light absorption efficiency of the dichroic dye increases, and color development is desirably ensured in a coloration state.

In addition, when the chiral reagent is included in the light modulating material, a color concentration can be increased. However, if an excessive amount of the chiral reagent is added, the alignment of the liquid crystal changes to a focal conic state, and light is absorbed by the dichroic dye even when voltage is not applied, resulting in a reduction of transparency. Accordingly, in order to maintain transparency when voltage is not applied to the light modulating material, and to increase the color concentration when voltage is applied to the material, the amount of the chiral reagent to be added in the first liquid crystal layer is preferably in the range of 0.1 to 30% by mass relative to a total mass of the first liquid crystal layer, and more preferably 0.1 to 10% by mass relative to a total mass of the first liquid crystal layer.

A plurality of different chiral reagents may be used. It is particularly preferable to use a combination of chiral reagents in which the temperature dependency of the chiral pitch thereof is positive and negative, to reduce the temperature dependency of the chiral pitch.

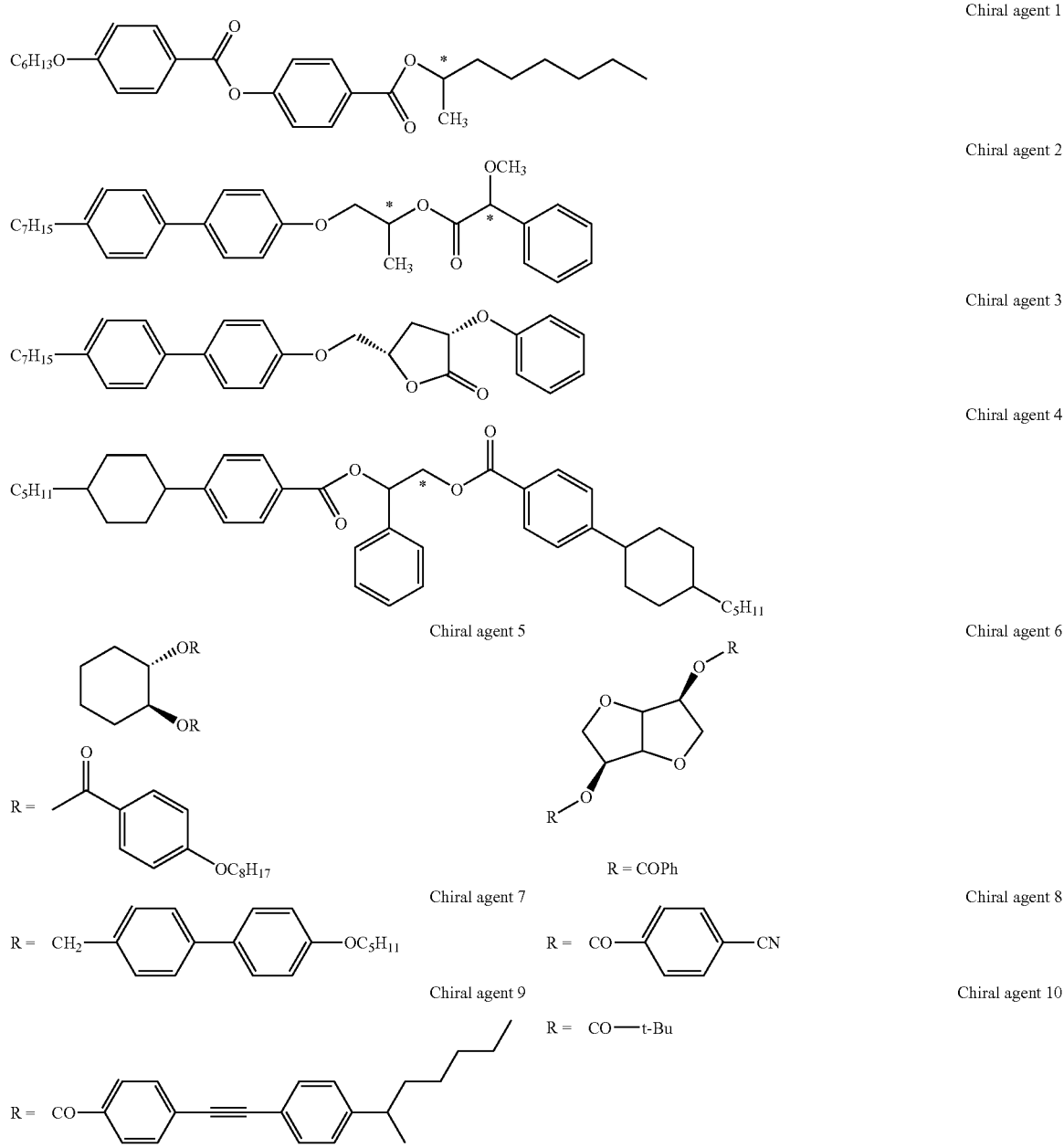

-continued

Chiral agent 11
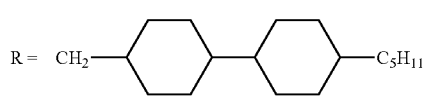

Chiral agent 12
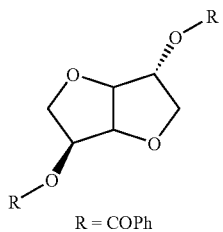
R = COPh

Chiral agent 13
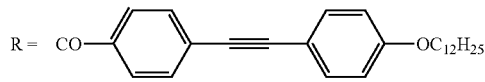

Chiral agent 14
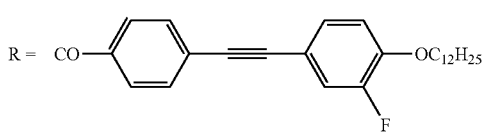

Chiral agent 15
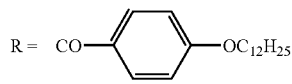
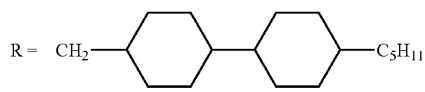

Chiral agent 16
R = CO—t-Bu

Chiral agent 17

Note that, in the first liquid crystal layer according to the invention, a plurality of dichroic dyes may be mixed with each other in a single liquid crystal layer. The dichroic dyes may have any color.

In addition, a plurality of first liquid crystal layers that have different colors from each other may be layered. Further, the first liquid crystal layers that have different colors may be arranged parallel to each other.

Second Liquid Crystal Layer

The second liquid crystal layer according to the invention changes its color from a colorless transparent state to a white scattered state when voltage is applied thereto. The second liquid crystal layer is provided to be closer to incident light as compared to the first liquid crystal layer.

The configuration of the second liquid crystal layer is not restricted as far as the second liquid crystal layer takes a scattered state when voltage is applied thereto. Examples of the second liquid crystal layer include a polymer dispersed liquid crystal, a gelation agent-containing liquid crystal, and a microcapsule-containing layer. When the second liquid crystal layer employs liquid crystals having large Δn and Δ∈, the light modulating material can have a high shading property and be driven at low voltage. However, the values of Δn and Δ∈ are not particularly restricted in the invention.

Polymer Dispersed Liquid Crystal

The second liquid crystal layer may include a polymer dispersed liquid crystal that is disclosed in Japanese Patent Application Laid-Open (JP-A) Nos. 05-61025, 05-265053, 06-3691, 06-23061, 05-203940, 06-242423, 06-289376, 08-278490, and 09-813174.

The polymer dispersed liquid crystal is roughly classified into a Polymer Dispersed Liquid Crystal (PDLC) type in which liquid crystal fills discontinuous voids of the polymer material to form a discontinuous phase and a Polymer Network Liquid Crystal (PNLC) in which liquid crystal fills continuous voids of the polymer material to form a continuous phase. Either of them may be used in the invention. The polymer dispersed liquid crystal can be manufactured by using an appropriate known method.

The mechanism of switching between a scattered state and a transparent state in a case where the second liquid crystal layer includes the polymer dispersed liquid crystal having a polymer material will be described.

A refractive index (n∥) of the liquid crystal molecules in a major axis direction thereof is set to be substantially identical with a refractive index ($n_p$) of the polymer material. In addition, the liquid crystal molecules and the polymer material are aligned vertically when voltage is not applied. In this case, a difference in refractive index of the liquid crystal molecules and the polymer material is small, so light penetrates the liquid crystal layer without being scattered. In other words, the liquid crystal layer becomes transparent.

The refractive index anisotropy (Δn) is a difference between the refractive index (n∥) of the liquid crystal molecule in a major axis direction and the refractive index (n⊥) of the liquid crystal molecule in a minor axis direction, and defined by the following equation.

$$\Delta n = n\| - n\perp$$

When voltage is applied to a light modulating material using a host liquid crystal in which Δn is not equal to 0, the host liquid crystal molecules tend to align horizontally, since the dielectric anisotropy Δ∈ of the host liquid crystal is negative. In this case, since the refractive index (n⊥) of the host liquid crystal molecule in a minor axis direction is different from the refractive index ($n_p$) of the polymer material, light is scattered. In order to increase the degree of light scattering, it is preferable that the difference between n⊥ and $n_p$ is large. Accordingly, it is preferable to use the host liquid crystal having large Δn.

The host liquid crystal for the first liquid crystal layer can be used as the liquid crystal that can be used in the second liquid crystal layer. However, in a case where a the phase transition method is used as a method to switch a colored state and a transparent state, a liquid crystal having Δn of 0.1 or more is preferably used as the liquid crystal having a large absolute value of Δn. More preferably, the liquid crystal has Δn of 0.12 or more. This is because the light scattering intensity is increased as Δn of the host liquid crystal increases in a scattered state resulted from the random focal conic state of the material, and the light modulating property is thus increased.

Examples of a method of manufacturing a polymer medium layer that acts as the second liquid crystal layer may include (1) a method including injecting a solution mixture of a monomer, a polymerization initiator, and a liquid crystal between counter electrodes and polymerizing the mixture by UV exposure or heat, and (2) a method including dissolving a liquid crystal and a polymer in an organic solvent, applying the resultant solution to a transparent electrode substrate, drying the substrate, and attaching a counter electrode substrate thereto.

In the method (1), either a monofunctional or polyfunctional monomer can be used as the monomer to be used to produce the polymer medium layer. However, in order to increase light transmittance when the layer is transparent (when voltage is not applied), it is preferable to use a monofunctional or difunctional monomer.

The amount of the polymer material in the polymer medium layer is preferably 10 to 90% by mass relative to the amount of the polymer medium layer, and more preferably 20 to 50% by mass relative to the amount of the polymer medium layer.

The polymer used for the polymer medium layer is not particularly restricted. Polymers used include water-soluble polymers such as siloxane polymer, methyl cellulose, polyvinyl alcohol, polyoxyethylene, polyvinyl butyral, and gelatin; polyacrylates, polymethacrylates; polyamides; polyesters; polycarbonates; polyvinyl alcohol derivatives as typified by vinyl acetate and polyvinyl butyral; cellulose derivatives like triacetyl cellulose; and non-water soluble polymer such as polyurethanes and polystyrenes. It is preferable that the polymer material according to the invention includes a mesogen having positive dielectric anisotropy in a side chain thereof. This is because an alignment direction of the polymer material is different from that of the host liquid crystal having the negative dielectric anisotropy when voltage is applied, and light scattering is increased due to a heterogeneous phase.

As a polymer used for the light modulating material of the invention, siloxane polymer, polyacrylates, and polymethacrylates are preferable from the viewpoint of high miscibility with the host liquid crystal. In particular, it is preferable to use a siloxane polymer because stain with the dichroic dyes is reduced and a display performance is thus improved.

Specific examples of the siloxane polymers of the invention will be shown below, but the invention should not be restricted to them.

No. 1
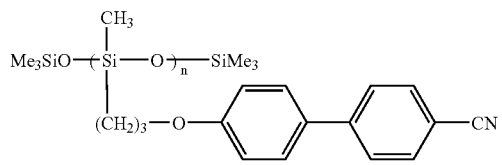

No. 2
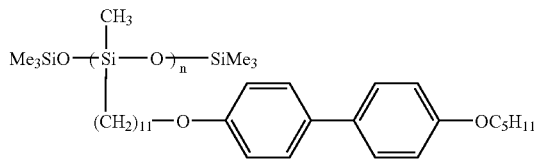

-continued

No. 3
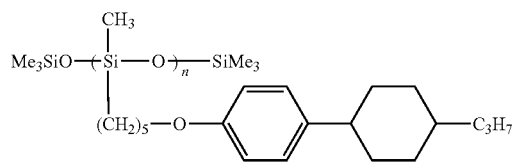

No. 4
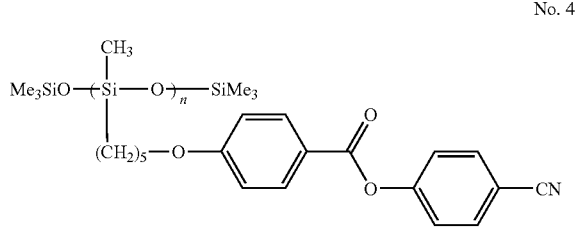

No. 5
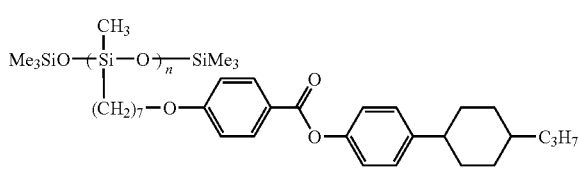

No. 6
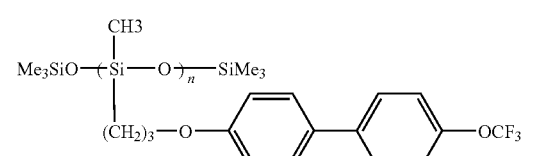

No. 7
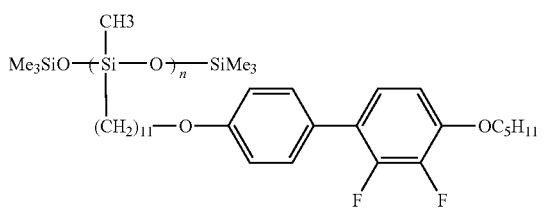

No. 8
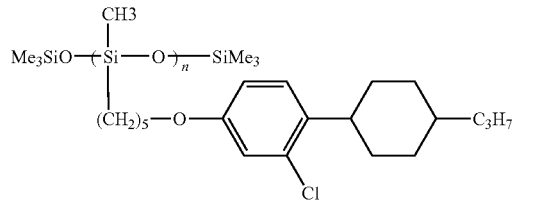

No. 9
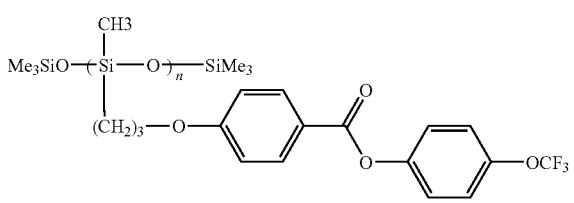

-continued

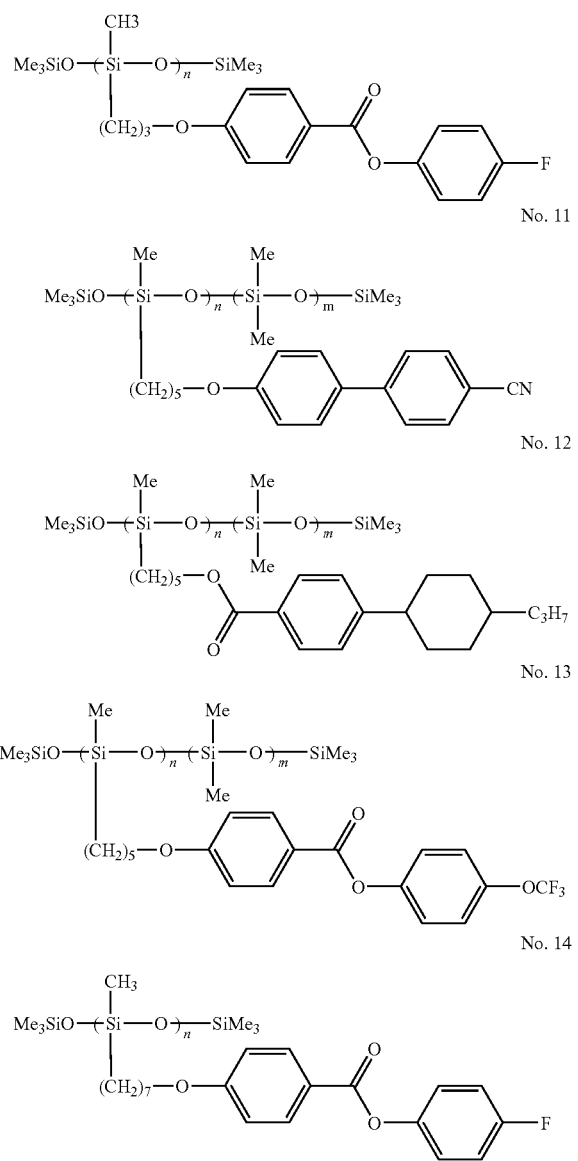

Further, the surfactant can be used in the polymer medium for the purpose of stabilizing the dispersion of the liquid crystal composition. While the surfactant which can be used in the invention is not particularly restricted, nonionic surfactants are preferable, and sorbitan fatty acid esters, polyoxyethylene fatty acid esters, polyoxyethylene alkyl ethers, fluoroalkylethylene oxides, and the like can be used.

In the second liquid crystal layer using the polymer dispersed liquid crystal of the invention, the thickness of the polymer medium layer is preferably 1 to 50 µm, more preferably 2 to 40 µm, and further preferably 5 to 30 µm.

Gelation Agent-Containing Liquid Crystal

The second liquid crystal layer may include a liquid crystal composition obtained by adding a gelation agent to a nematic liquid crystal, such as those disclosed in "J. Mater. Chem." Vol. 12, pp. 2197-2201, 2002. The nematic liquid crystal can be gelated to perform switching between a scattered state and a light transmitting state.

The gelation agent according to the invention is defined as a material that has an ability of forming a gelated liquid crystal composition when the material is mixed with the host liquid crystal. The liquid crystal composition is gelated to separate the gel network formed by means of the gelation agent and the host liquid crystal, which form micro phases. In a case where the refractive index of the gelation agent network is different from the refractive indices of the randomly arranged host liquid crystal molecules, light is scattered. Meanwhile, in a case where the host liquid crystal molecules are arranged perpendicular to the electrode substrates, the refractive index of the host liquid crystal molecule in a major axis direction is set to be substantially the same as the refractive index of the gelation agent network. Thus, a transparent state can be attained without scattering of light. However, because the gelation agent network has a loose structure due to a hydrogen bond, movement of the host liquid crystal is not so obstructed. Thus, switching between the scattered state and the transparent state is easily performed.

Any gelation agent may be used. Examples of the gelation agent include compounds that are disclosed in JP-A No. 11-21556 and Japan Liquid Crystal Society Forum Notice, p. 371, 2005. Furthermore, it is preferred to use a gelation agent having two or more hydrogen bond groups. Examples of the hydrogen bond groups include an amide group, a hydroxy group, a carboxy group, an ester group, and an amino group. Further, a compound having two or more amide groups is preferably used as the gelation agent.

The molecular weight of the gelation agent is preferably 10 to 1000, and more preferably 50 to 500. It is advantageous to use the gelation agent having a low molecular weight, because it is possible to reduce the driving voltage required to change the alignment of liquid crystals and switching between the scattered state and the transparent state is quickly performed.

Preferable examples of the combination of structure of the gelation agent include: a combination of a gelation agent having two or more hydrogen bond groups, a gelation agent having a straight chain alkyl group that has 4 to 20 carbon atoms and may have a substituent group at a terminal thereof, and a gelation agent having a straight chain (per)fluoroalkyl group that has 4 to 20 carbon atoms and may have a substituent group at a terminal thereof, a combination of a gelation agent having two or more hydrogen bond groups, a gelation agent having a straight chain alkyl group that has 4 to 20 carbon atoms and may have a substituent group at a terminal thereof, and a gelation agent having an alicyclic structure; a combination of a gelation agent having two or more hydrogen bond groups, a gelation agent having a straight chain (per)fluoroalkyl group that has 4 to 20 carbon atoms and may have a substituent group at a terminal thereof, and a gelation agent having an alicyclic structure; and a combination of a gelation agent having two or more hydrogen bond groups, a gelation agent having a straight chain alkyl group that has 4 to 20 carbon atoms and may have a substituent group at a terminal, a gelation agent having a straight chain (per)fluoroalkyl group that has 4 to 20 carbon atoms and may have a substituent group at a terminal thereof, and a gelation agent having an alicyclic structure.

Preferable examples of the gelation agent include compounds represented by the following Formula (4).

Formula (4)

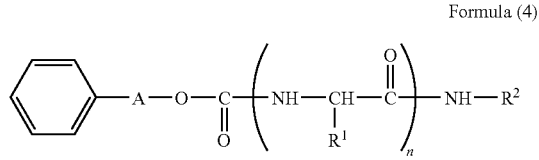

In the Formula (4), A represents an alkylene group, an alkenylene group, or an alkynylene group. The alkylene group has preferably 1 to 12 carbon atoms and more preferably 1 to 10 carbon atoms. Examples of the alkylene group include a methylene group, an ethylene group, a propylene group, a butylene group, a pentylene group, and a cyclohexyl-1,4-diyl group. The alkenylene group has preferably 2 to 12 carbon atoms and more preferably 2 to 10 carbon atoms. Examples of the alkenylene group include ethenylene and the like. The alkynylene group has preferably 2 to 12 carbon atoms and more preferably 2 to 10 carbon atoms. Examples of the alkynylene group include ethynylene and the like.

In the Formula (4), $R^1$ is an alkyl group or an aryl group, preferably a secondary alkyl group having 3 to 10 carbon atoms, and more preferably a secondary alkyl group having 3 to 5 carbon atoms.

In the Formula (4), $R^2$ is an alkyl group or an aryl group, preferably an alkyl group having 1 to 30 carbon atoms, and more preferably an alkyl group having 4 to 20 carbon atoms. The alkyl group may have an additional substituent, and examples of the substituent include an amide group, a hydroxy group, a carboxy group, and an amino group.

In the Formula (4), n is an integer from 1 to 5, and preferably from 1 to 3.

Specific examples of the gelation agent include gelation agents that are disclosed in "Advanced Material", Vol. 12, p. 1237, 2000, and "J. Mater. Chem." Vol. 12, pp. 2197-2201, 2002. Hereinafter, specific examples of the gelation agent will be shown, but the invention is not restricted thereto.

G-1

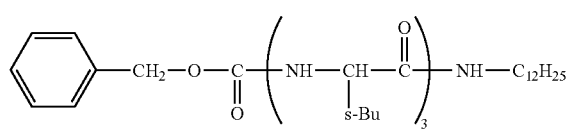

G-2

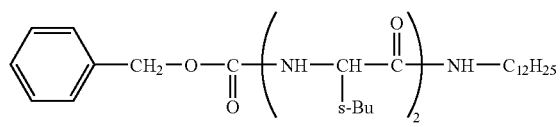

G-3

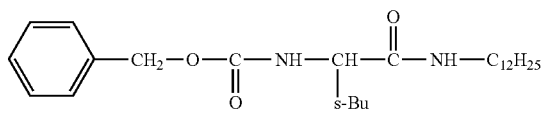

G-4

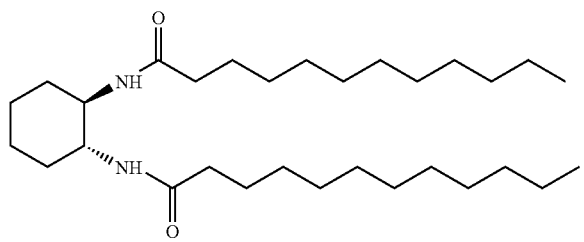

G-5

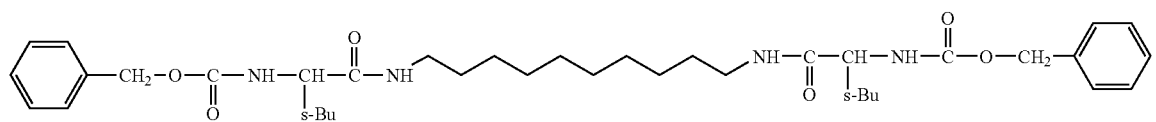

G-6

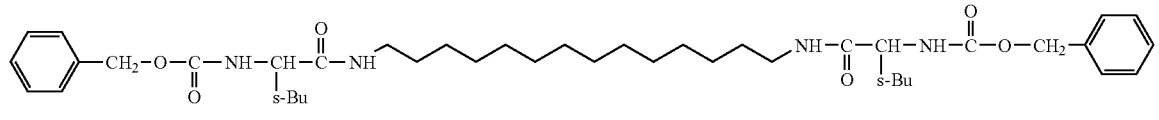

G-7

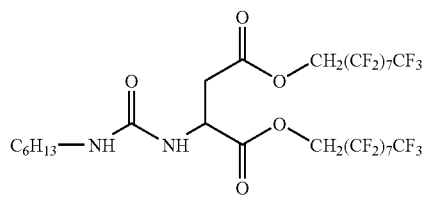

G-8

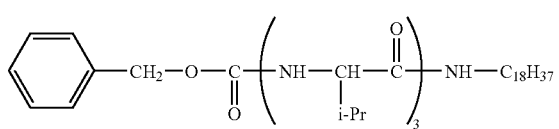

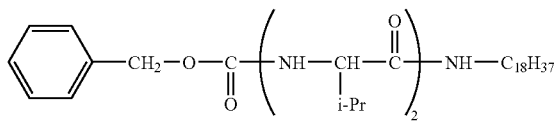 G-9

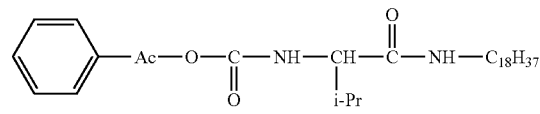 G-10

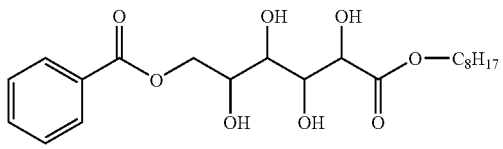 G-11

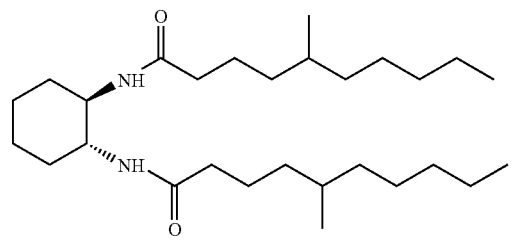 G-12

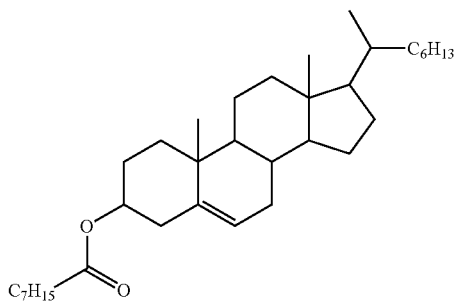 G-13

The gelation agent used in the invention can be synthesized in accordance with a method disclosed in "J. Mater. Chem." Vol. 12, pp. 2197-2201, 2002. Furthermore, the liquid crystal and the gelation agent may be mixed with each other, and the mixture may then be applied or injected when the liquid crystal layer has formed an isotropic layer and the mixture has been heated to a gelation temperature, to form a gelation agent-containing liquid crystal that is the second liquid crystal layer.

The amount of the gelation agent to be added is preferably in the range of 0.1 to 10% by mass and more preferably 0.1 to 3% by mass relative to a total mass of the second liquid crystal layer. When the amount is in the above-mentioned range, driving voltage required to change the alignment of liquid crystal is reduced, switching between the scattered state and the transparent state is quickly performed, and a ratio of light transmittance (contrast) between the scattered state and the transparent state is increased.

In a case where the second liquid crystal layer is the gelation agent-containing liquid crystal layer, the thickness of the gelation agent-containing liquid crystal layer is set to preferably 5 to 50 μm and more preferably 5 to 20 μm in order to increase the shading property.

Microcapsule-Containing Layer

The second liquid crystal layer may include a liquid crystal composition in a microcapsule form as disclosed in JP-A No. 11-24090 and the like. Each of the microcapsules is constructed of a polymer resin wall and a dual frequency addressable smectic composition having the liquid crystal composition, which is encapsulated in the polymer resin wall. The mechanism of switching between the scattered and transparent states when the second liquid crystal layer is the microcapsule-containing layer is basically the same as the case of the polymer dispersed liquid crystal.

The microcapsule can appropriately be produced by using a known method.

The microcapsule can include various liquid crystal compositions different from one another. Therefore, different liquid crystal compositions in the separate microcapsules may be independently driven. In this case, host liquid crystals, dichroic dyes, and/or other additives can be varied in each of the liquid crystal compositions, and addition amounts of any of these may be varied in each of the liquid crystal compositions.

Configuration of Light Modulating Material

Basic Structure of Light Modulating Material

In the light modulating material according to the invention, at least the first liquid crystal layer and the second liquid crystal layer are layered, and the second liquid crystal layer is provided to be closer to incident light as compared to the first liquid crystal layer. Accordingly, the light modulating material may include a pair of electrode substrates, may include a plurality of pairs of electrode substrates.

Figure 2:
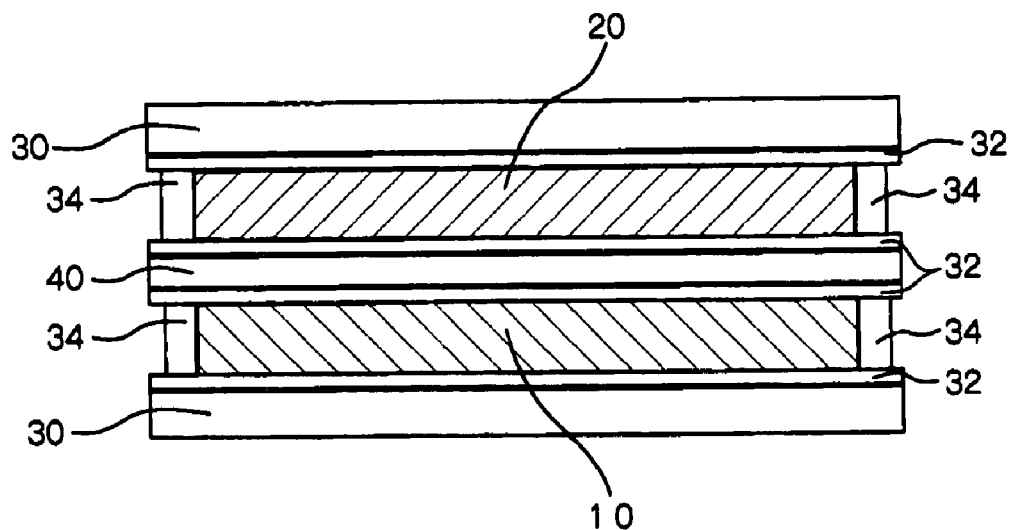
FIG. 2 is a schematic view illustrating an embodiment of configuration of a light modulating material.

In a case of the former light modulating material, as shown in FIG. 2, a first liquid crystal layer 10 and a second liquid crystal layer 20 are interposed between a pair of electrode substrates 30, and a transparent substrate 40 is interposed between the first liquid crystal layer 10 and the second liquid crystal layer 20. Alignment films 32 are provided on surfaces of the electrode substrates 30 and the transparent substrate 40, which come into contact with the liquid crystal layers. Both ends of the first liquid crystal layer 10 and the second liquid crystal layer 20 are each sealed by using a sealing agent 34.

Examples of a known material for the transparent substrate 40 include polyethylene terephthalate (PET), polyethylene naphthalate (PEN), polyethersulfone (PES), polycarbonate (PC), cycloolefin, and triacetyl cellulose (TAC). In views of transparency and the like, preferable examples thereof include PET, PES, and PC.

Figure 3:
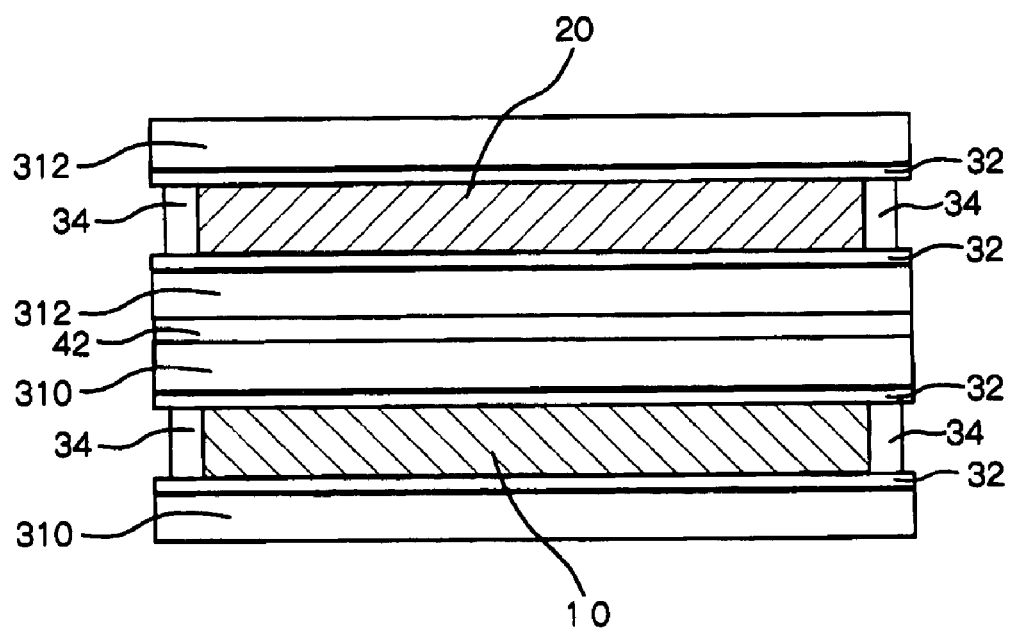
FIG. 3 is a schematic view illustrating another embodiment of configuration of a light modulating material.

In a case of the latter light modulating material, as shown in FIG. 3, a first liquid crystal device in which the first liquid crystal layer 10 is interposed between a pair of electrode substrates 310 and a second liquid crystal device in which the second liquid crystal layer 20 is interposed between a pair of electrode substrates 312 adhere to each other by means of an adhesive layer 42.

Examples of a material constituting the adhesive layer 42 include known resins such as an acryl, silicon, epoxy, or olefin resin. It is preferable to use an acryl resin having high transparency.

In the case of the light modulating material shown in FIG. 2, because the first liquid crystal layer 10 and the second liquid crystal layer 20 are separated from each other by the transparent substrate 40, the transparency when voltage is not applied thereto is not reduced as compared with the case of the light modulating material shown in FIG. 3 in which the electrode substrates 310 and 312 and the adhesive layer 42 are interposed between the first liquid crystal layer 10 and the second liquid crystal layer 20. Thus, the light modulating material shown in FIG. 2 has shading properties higher than those of the case of the light modulating material shown in FIG. 3.

Each Constitutional Member

Electrode Substrate

As an electrode substrate, one that the electrode layer is formed on the substrate (support), which is usually comprised of glass or plastic (polymer), can be used. A plastic substrate is preferable. Examples of the material for the plastic substrate include an acrylic resin, a polycarbonate resin, an epoxy resin, polyethersulfone (PES), and polyethylene naphthalate (PEN). As for the substrate, those described in the pages of 218 to 231 of "Liquid Crystal Device Handbook" (edited by the 142nd Committee in Japan Society for the Promotion of Science, Nikkan Kogyo Shimbun, Ltd., 1989) can be used. Specific examples of the electrode substrate include known substrates made of polyethylene terephthalate (PET), polyethylene naphthalate (PEN), polyethersulfone (PES), polycarbonate (PC), glass, or the like.

An electrode layer formed on the substrate is preferably a transparent electrode layer. For example, those described in the pages of 232 to 239 of "Liquid Crystal Device Handbook" (edited by the 142nd Committee in Japan Society for the Promotion of Science, Nikkan Kogyo Shimbun, Ltd., 1989) can be used. Specific examples of the electrode layer include those formed of, for example: an oxide layer of indium tin oxide (ITO), IZO, ZnO, or the like; a metal such as Ag, Au, Pt, or Al; a conductive polymer such as PEDOT or polyanialine. In views of transparency and conductivity of the electrode, it is preferable to use ITO or IZO.

Provided that, the transparent electrode substrate has a surface resistance of 30 to 200Ω/□.

Alignment Film

The light modulating material of the invention preferably includes an alignment film for vertical alignment so that a transparent state is obtained even though voltage is not applied. The alignment film can be formed by known methods such as (1) a method in which a polyimide precursor having an alkyl group of a long chain at a side chain thereof (for example, SE-1211 and SE-5300 (both trade names, manufactured by Nissan Chemical Industries, Ltd.), or JALS-2096 (trade name, manufactured by JSR)) is applied to the transparent electrode substrate and the transparent substrate, and the resultant is then sintered, (2) a method in which $SiO_2$ is deposited at an incline on the transparent electrode substrate and the transparent substrate to form a film, and (3) a method in which the transparent electrode substrate and the transparent substrate are subjected to surface modification with a silane coupling agent (for example, n-octadecyltrimethoxysilane). In the case where the transparent electrode substrate and the transparent substrate is subjected to silane coupling treatment, it is preferable to form a colorless transparent oxide film that is made of $SiO_2$, $Al_2O_3$, or $TiO_2$, or the like in order to provide an insulating property or ensure coupling using the silane coupling agent. The oxide film can be formed by known methods such as sputtering, ion plating, or vacuum deposition.

Spacer

In the light modulating material of the invention, for example, a spacer may be provided between a pair of substrates in order to maintain a predetermined gap between electrodes facing each other. A space can be provided between the substrates by the spacer, and the liquid crystal composition can be provided into the space to produce the light modulating material.

Spacers that are disclosed on pages 257 to 262 of "Liquid Crystal Device Handbook" (edited by the 142nd committee in Japan Society for the Promotion of Science, the Nikkan Kogyo Shimbun Ltd., 1989) can be used. Examples of a method of introducing the spacer include a method of applying spherical spacers made of a polymer or silica on the substrate, and a method of forming bar-shaped spacers on a substrate by using a resist.

In the case of the light modulating material of the invention, the thickness of the liquid crystal layer, that is, the interval between the substrates that are spaced apart from each other by the spacer, is preferably 1 to 50 μm and more preferably 5 to 20 μm. When the thickness is more than 50 μm, the alignment of the liquid crystal molecules becomes focal conic. Accordingly, the light transmittance in a transparent state tends to reduce. Furthermore, when the thickness is less than 1 μm, a rate of absorption by a dye tends to reduce, resulting in difficulty in obtaining a sufficient contrast.

Other Members

Examples of other members include a barrier film, an ultraviolet absorption layer, an antireflection layer, a hard court layer, a fouling prevention layer, an insulating film between organic layers, a metallic reflecting plate, a phase difference plate, and an alignment film. One kind of them may be used alone, or two or more kinds of them may be used in combination.

The barrier film is suitable to obstruct the passage of water and/or oxygen in the light modulating material. Any film of organic polymer compounds, inorganic compounds, and organic-inorganic complexes is acceptable as the barrier film. Examples of the organic polymers include ethylene-vinyl alcohol (EVOH), polyvinyl alcohol (PVA/PVOH), nylon MXD6 (N-MXD), and nano-composite nylons. Examples of the inorganic compounds include silica, alumina, and binary systems. The details have been described in, for example, "Development of high barrier materials, film forming technology, and barrier property measurement and evaluation method" (Technical Information Institute Co., Ltd., 2004).

In the invention, it is preferable to install the ultraviolet absorption layer to prevent the deterioration of the light modulating material because of the ultraviolet rays.

The ultraviolet absorption layer preferably has an antioxidant such as 2,2-thiobis(4-methyl-6-t-butylphenol) or 2,6-di-t-butylphenol, and an ultraviolet absorbent such as 2-(3-t-butyl-5-methyl-2-hydroxyphenyl)-5-chlorobenzotriazole or alkoxybenzophenone.

In the light modulating material of the invention, it is preferable to place the ultraviolet absorption layer on the surface of the support where a transparent electrode is not placed from the viewpoint of easiness of manufacturing. Moreover, while it may be installed on both sides of two opposed supports, and it may be installed on only one side, being installed at least on the support in the incidence side of light is preferable so that the ultraviolet absorption layer may exert its function.

As a hard court layer, well-known ultraviolet curing or electron beam curing acrylic resins or epoxy resins can be used.

As a fouling prevention layer, water-repellent and oil-repellent materials like a fluorine-containing organic polymer can be used.

Applications

Because being able to give a high light modulating performance, the light modulating material of the invention can be suitably used as modulated light, security, an in-vehicle application, an interior design, an advertisement, and an information display panel. In particular, since the light modulating material of the invention is capable of preventing discoloration of the dichroic dye due to direct sunlight, the light modulating material can be used outside. Furthermore, the light modulating material of the invention can be used over a longer period of time as compared to a light modulating material that does not have the configuration of the invention. Thus, the light modulating material of the invention can be suitably used in cases where it is difficult to replace the light modulating material.

EXAMPLES

The invention will be described more specifically citing example as follows. Materials, reagents, the amount of substances and the ratio, operations and the like shown in the following examples can be properly changed as long as being not deviated from the purport of the invention. Therefore, the range of the invention should not be limited to the following specific examples.

Example 1

Production of Second Liquid Crystal Layer

A vertical alignment film: SE-1211 (trade name, manufactured by Nissan Chemical Industries, Ltd.) was applied to each of ITO substrates (manufactured by EHC: 100Ω/□) and the resultants were then sintered. The resultant substrates were attached at an interval of 8 μm to produce a liquid crystal cell.

A liquid crystal composition precursor was made by mixing MLC-6610 (trade name, manufactured by Merck & Co., Inc., $\Delta\in$: −3.1, $\Delta$n: 0.0996, nematic liquid crystal) used as a liquid crystal compound, with 5% by mass of A-BPE-4 (trade name, manufactured by Shin-Nakamura Chemical Co., Ltd.) used as a monomer and 0.4% by mass of DAROCUR® 1173 (manufactured by Ciba Specialty Chemicals) used as a photopolymerization initiator. The liquid crystal composition precursor was injected into the liquid crystal cell, light was radiated thereonto by using a UV lamp (emission wavelength of 360 nm and power of 36 W) for 10 min, and heating was performed in an oven at 80° C. for 1 hour. Photolec A-720 (trade name, manufactured by Sekisui Chemical Co., Ltd.) as a sealing agent was applied by dropping to an opening of the cell, and light was radiated thereonto by using a UV lamp (emission wavelength of 360 nm and power of 36 W) for 5 min, to thereby produce a second liquid crystal layer.

The obtained second liquid crystal layer was transparent and had a light transmittance of 80% when voltage was not applied thereto. When a square wave that had a frequency of 100 Hz and voltage of +10 V was applied, the second liquid crystal layer takes a scattered state with a light transmittance of 35%. Thus, it was found that the second liquid crystal layer can reduce light intensity and allow the light having a reduced intensity to enter the first liquid crystal layer.

Production of First Liquid Crystal Layer

A liquid crystal cell was produced in the same manner as in the production of the second liquid crystal layer. A photocurable adhesive: LCR0631 (trade name, manufactured by Toagosei Co., Ltd.) was applied to the liquid crystal cell by spin coating. Then, the second liquid crystal layer was adhered thereto, and light was radiated thereonto by using a UV lamp (emission wavelength of 360 nm and power of 36 W) for 10 min to adhere the first and second liquid crystal cells. As a result, a structure in which a hollow liquid crystal cell which is not filled with liquid crystal was layered on the second liquid crystal layer was produced.

More specifically, a liquid crystal composition was prepared by dissolving 1% by mass of G313 (trade name, manufactured by Nippon Kanko Shikiso) as a dichroic dye and 0.6% by mass of R-811 (trade name, manufactured by Merck & Co., Inc.) as a chiral reagent in ZLI-2806 (trade name, manufactured by Merck & Co., Inc., $\Delta\Delta$: −4.6, $\Delta$n: 0.0437, nematic liquid crystal) as the liquid crystal. The liquid crystal composition was injected into the hollow liquid crystal cell. Photolec A-720 (trade name, manufactured by Sekisui Chemical Co., Ltd.) as a sealing agent was applied by dropping to an opening of the cell, and light was radiated thereonto by using a UV lamp (emission wavelength of 360 nm and power of 36 W) for 5 min, to thereby produce a first liquid crystal layer.

Then, a photocurable adhesive LCR0631 (trade name, manufactured by Toagosei Co., Ltd.) was applied by using a wire bar on the liquid crystal layer to have a thickness of 6.9 μm. After that, the second liquid crystal layer was adhered thereto, light was radiated thereonto by using a UV lamp (emission wavelength of 360 nm and power of 36 W) for 10 min to adhere the first and second liquid crystal layers, to thereby produce a light modulating device.

The thus-produced light modulating device was transparent when voltage was not applied thereto. At this time, the light transmittance of the light modulating device was measured by using a spectrophotometer UV-2400 (trade name, manufactured by Shimadzu Corporation), and it was found that the light transmittance was 51% at a peak absorption wavelength of the dichroic dye, that was 668 nm. When a square wave that had a frequency of 1000 Hz and voltage of ±10 V was applied, the light modulating device took a colored state and the light transmittance thereof at the wavelength of 668 nm was 14%.

Furthermore, the results of measurement by using a 3-D variable angle spectrophotometer system GCMS-1B (trade name, manufactured by Murakami Color Research Laboratory Co., Ltd.) showed that, in the case of the light modulating device, the light transmittance was reduced by ten percent at a light receiving angle of 0° with respect to an incident angle of 0° and light scattering was able to be detected at the light receiving angle in the range of −8° to 8°.

Example 2

Production of Second Liquid Crystal Layer $SiO_2$ was applied on a PEN film (125Ω/□) provided with ITO to provide a film having a thickness of 3000 Å by ion plating. A mask was then applied on an area to which a sealing agent was applied and an area to which an ejection electrode was applied on the film by using polyimide tape. The film was immersed in a solution obtained by dissolving n-octadecyltrimethoxysilane in a solvent mixture of 95% by mass of isopropyl alcohol and 5% by mass of pure water, and then heated in an oven at 80° C. for 10 min.

After the polyimide tape was removed, a solution produced by dissolving 2% by mass of 3-glycidoxypropyl methoxysilane (manufactured by Chisso Corporation) in ethanol was applied on the areas from which the tape was removed, and the film was dried in an oven at 80° C. Next, the film was immersed in pure water and subsequently isopropyl alcohol in this order, subjected to ultrasonic wave washing, and dried.

After spacers each having a particle size of 8 μm were applied, TB2202 (trade name, manufactured by Three Bond Co., Ltd.) was applied as a sealing agent. Then, a liquid crystal composition precursor produced by mixing MLC-6610 (trade name, manufactured by Merck & Co., Inc., Δ∈: −3.1, Δn: 0.0996, nematic liquid crystal) as a liquid crystal, 5% by mass of A-BPE-4 (trade name, manufactured by Shin-Nakamura Chemical Co., Ltd.) as a monomer, and 0.2% by mass of DAROCUR® 1173 (manufactured by Ciba Specialty Chemicals) as a photopolymerization initiator was applied by dropping to the film. Another substrate was layered thereon, and adhered by pressing. After light was radiated thereonto by using a UV lamp (emission wavelength of 360 nm and power of 36 W) for 10 min, heating was performed in an oven at 80° C. for 1 hour, to thereby produce a second liquid crystal layer.

Production of First Liquid Crystal Layer

A film substrate was treated in the same manner as in the case of the second liquid crystal layer. A liquid crystal composition produced by dissolving 1% by mass of G313 (trade name, manufactured by Nippon Kanko Shikiso) as a dichroic dye and 0.6% by mass of R-811 (trade name, manufactured by Merck & Co., Inc.) as a chiral reagent in ZLI-2806 (trade name, manufactured by Merck & Co., Inc., Δ∈: −4.6, Δn: 0.0437, nematic liquid crystal) as a liquid crystal was applied by dropping to the film. Another substrate was layered thereon and adhered by pressing. Heating was performed in an oven at 80° C. for 1 hour to produce a first liquid crystal layer, to thereby produce a light modulating device.

The thus-produced light modulating device was transparent when voltage was not applied thereto. At this time, the light transmittance of the light modulating device was 48% at a peak absorption wavelength of the dichroic dye, that was 668 nm. When a square wave that had a frequency of 1000 Hz and voltage of ±10 V was applied, the light modulating device took a colored state and the light transmittance thereof at the wavelength of 668 nm was 12%.

Furthermore, the results of measurement by using a 3-D variable angle spectrophotometer system GCMS-1B (trade name, manufactured by Murakami Color Research Laboratory Co., Ltd.) showed that, in the case of the light modulating device, the light transmittance was reduced by ten percent at a light receiving angle of 0° with respect to an incident angle of 0° and light scattering was able to be detected at the light receiving angle in the range of −8° to 8°.

Comparative Example 1

A vertical alignment film: SE-1211 (trade name, manufactured by Nissan Chemical Industries, Ltd.) was applied to each of ITO substrates (100Ω/□), and the resultants were then sintered. The resultant substrates were attached at an interval of 8 μm to produce a liquid crystal cell. A liquid crystal composition produced by dissolving 1% by mass of G313 (trade name, manufactured by Nippon Kanko Shikiso) as a dichroic dye and 0.6% by mass of R-811 (trade name, manufactured by Merck & Co., Inc.) as a chiral reagent in ZLI-2806 (trade name, manufactured by Merck & Co., Inc., Δ∈: −4.6, Δn: 0.0437, nematic liquid crystal) as a liquid crystal was injected into the liquid crystal cell. Photolec A-720 (trade name, manufactured by Sekisui Chemical Co., Ltd.) as a sealing agent was applied by dropping to an opening of the cell, and light was radiated thereonto by using a UV lamp (emission wavelength of 360 nm and power of 36 W) for 5 min, to thereby produce a light modulating device.

The thus-produced light modulating device was transparent when voltage was not applied thereto. At this time, by using a 3-D variable angle spectrophotometer system GCMS-1B (trade name, manufactured by Murakami Color Research Laboratory Co., Ltd.) showed that the light transmittance of the light modulating device was 78% at a peak absorption wavelength of 670 nm. When a square wave that had a frequency of 1000 Hz and voltage of 110 V was applied, the light modulating device took a colored state and the light transmittance thereof at the wavelength of 668 nm was 42%.

Furthermore, the scattered light was detected only at the light receiving angle in the range of −3 to 3° with respect to the incident angle of 0°. In other words, it was found that, without the second liquid crystal layer according to the invention, the directivity of light can not be reduced.

A light discoloration test of the light modulating devices of Example 1 and Comparative Example 1 was performed under conditions where the voltage was applied to the light modulating devices to incur coloring and light was radiated thereonto by using a xenon lamp of 100,000 Lx. Provided that, a sharp cut filter (trade name: SC39, manufactured by Fujifilm Corporation) was provided between the xenon lamp and the light modulating devices for the purpose of cutting UV. For evaluation, light absorbance of the light modulating devices was measured at a wavelength of 669 nm before and after the light discoloration test.

In the case of the light modulating device of Comparative Example 1, the light absorbance measured after light was continuously radiated for 840 hours reduced by 20% with respect to the initial light absorbance measured before the radiation of light was performed. On the other hand, the light absorbance of the light modulating device of Example 1 reduced no more than 5%. Accordingly, it was found that light discoloration in the light modulating device of the invention can be reduced due to light scattering of the second liquid crystal layer of the invention.

What is claimed is:

1. A light modulating material comprising:
    a first liquid crystal layer which comprises a dichroic dye and changes from a colorless transparent state to a colored transparent state when voltage is applied thereto; and
    a second liquid crystal layer which changes from a colorless transparent state to a white scattered state when voltage is applied thereto, wherein the first liquid crystal layer and the second liquid crystal layer are layered together and the second liquid crystal layer is provided closer to a surface of the light modulating material on which light is incident compared to the first liquid crystal layer.

2. A light modulating material of claim 1, wherein the first liquid crystal layer comprises a vertical alignment film.

3. A light modulating material of claim 2, wherein the dichroic dye has a positive order parameter.

4. A light modulating material of claim 3, wherein the first liquid crystal layer further comprises a chiral reagent.

5. A light modulating material of claim 4, wherein an amount of the chiral reagent is 0.1 to 10% by mass relative to a total mass of the first liquid crystal layer.

6. A light modulating material of claim 4, wherein the second liquid crystal layer is a polymer dispersed liquid crystal layer which comprises a polymer material.

7. A light modulating material of claim 4, further comprising:
a pair of electrode substrates between which the first liquid crystal layer and the second liquid crystal layer are interposed; and
a transparent substrate which is interposed between the first liquid crystal layer and the second liquid crystal layer.

8. A light modulating material of claim 3, wherein the second liquid crystal layer is a polymer dispersed liquid crystal layer which comprises a polymer material.

9. A light modulating material of claim 3, further comprising:
a pair of electrode substrates between which the first liquid crystal layer and the second liquid crystal layer are interposed; and
a transparent substrate which is interposed between the first liquid crystal layer and the second liquid crystal layer.

10. A light modulating material of claim 2, wherein the first liquid crystal layer further comprises a chiral reagent.

11. A light modulating material of claim 10, wherein an amount of the chiral reagent is 0.1 to 10% by mass relative to a total mass of the first liquid crystal layer.

12. A light modulating material of claim 10, wherein the second liquid crystal layer is a polymer dispersed liquid crystal layer which comprises a polymer material.

13. A light modulating material of claim 10, further comprising:
a pair of electrode substrates between which the first liquid crystal layer and the second liquid crystal layer are interposed; and
a transparent substrate which is interposed between the first liquid crystal layer and the second liquid crystal layer.

14. A light modulating material of claim 2, wherein the second liquid crystal layer is a polymer dispersed liquid crystal layer which comprises a polymer material.

15. A light modulating material of claim 2, further comprising:
a pair of electrode substrates between which the first liquid crystal layer and the second liquid crystal layer are interposed; and
a transparent substrate which is interposed between the first liquid crystal layer and the second liquid crystal layer.

16. A light modulating material of claim 1, wherein the first liquid crystal layer further comprises a chiral reagent.

17. A light modulating material of claim 16, wherein an amount of the chiral reagent is 0.1 to 10% by mass relative to a total mass of the first liquid crystal layer.

18. A light modulating material of claim 17, wherein the second liquid crystal layer is a polymer dispersed liquid crystal layer which comprises a polymer material.

19. A light modulating material of claim 17, further comprising:
a pair of electrode substrates between which the first liquid crystal layer and the second liquid crystal layer are interposed; and
a transparent substrate which is interposed between the first liquid crystal layer and the second liquid crystal layer.

20. A light modulating material of claim 16, wherein the second liquid crystal layer is a polymer dispersed liquid crystal layer which comprises a polymer material.

21. A light modulating material of claim 16, further comprising:
a pair of electrode substrates between which the first liquid crystal layer and the second liquid crystal layer are interposed; and
a transparent substrate which is interposed between the first liquid crystal layer and the second liquid crystal layer.

22. A light modulating material of claim 1, wherein the second liquid crystal layer is a polymer dispersed liquid crystal layer which comprises a polymer material.

23. A light modulating material of claim 22, further comprising:
a pair of electrode substrates between which the first liquid crystal layer and the second liquid crystal layer are interposed; and
a transparent substrate which is interposed between the first liquid crystal layer and the second liquid crystal layer.

24. A light modulating material of claim 1, further comprising:
a pair of electrode substrates between which the first liquid crystal layer and the second liquid crystal layer are interposed; and
a transparent substrate which is interposed between the first liquid crystal layer and the second liquid crystal layer.

* * * * *